US010983484B2

(12) United States Patent
Vanhoudt et al.

(10) Patent No.: US 10,983,484 B2
(45) Date of Patent: Apr. 20, 2021

(54) HIERARCHICAL IMPLICIT CONTROLLER FOR SHIELDED SYSTEM IN A GRID

(71) Applicants: VITO NV, Mol (BE); NODA Intelligent Systems AB, Karlshamn (SE)

(72) Inventors: Dirk Vanhoudt, Mol (BE); Gowri Suryanarayana, Mol (BE); Fjo De Ridder, Mol (BE); Johan Christian Johansson, Karlshamn (SE)

(73) Assignees: NODA INTELLIGENT SYSTEMS AB, Karlshamn (SE); VITO NV, Mol (BE)

( * ) Notice: Subject to any disclaimer, the term of this patent is extended or adjusted under 35 U.S.C. 154(b) by 0 days.

(21) Appl. No.: 16/464,796

(22) PCT Filed: Dec. 27, 2017

(86) PCT No.: PCT/EP2017/084667
§ 371 (c)(1),
(2) Date: May 29, 2019

(87) PCT Pub. No.: WO2018/122273
PCT Pub. Date: Jul. 5, 2018

(65) Prior Publication Data
US 2019/0324411 A1 Oct. 24, 2019

(30) Foreign Application Priority Data
Dec. 27, 2016 (EP) .................................... 16207020

(51) Int. Cl.
G05B 13/02 (2006.01)
H02J 3/00 (2006.01)
H02J 13/00 (2006.01)

(52) U.S. Cl.
CPC ............ *G05B 13/0265* (2013.01); *H02J 3/00* (2013.01); *H02J 13/0006* (2013.01); *H02J 3/003* (2020.01)

(58) Field of Classification Search
CPC .......... G06F 21/57; G06F 21/71; G06F 21/72; G06F 21/87; H04L 9/006; H04L 9/083;
(Continued)

(56) References Cited

U.S. PATENT DOCUMENTS 4,971,136 A 11/1990 Mathur et al.
2002/0152298 A1* 10/2002 Kikta ..................... H04L 67/34
709/223
(Continued)

FOREIGN PATENT DOCUMENTS

CN 103023018 A 4/2013
CN 104008432 A 8/2014
(Continued)

OTHER PUBLICATIONS

European Communication in corresponding European Application No. 17832507.2-1205, dated Nov. 6, 2019.
(Continued)

*Primary Examiner* — Kidest Bahta
(74) *Attorney, Agent, or Firm* — Bacon & Thomas, PLLC

(57) ABSTRACT

A system or a method to at least partially steer systems, e.g. heating and/or cooling and clusters of systems, when the controller of the system is unknown or when the transfer function of the system is unknown. The steering of the energy flow, e.g. heating/cooling/electrical energy, includes providing energy to the system or the cluster of systems and preferably to manage common constraints, like capacity problems.

20 Claims, 17 Drawing Sheets

(58) Field of Classification Search
CPC .... H04L 9/3247; H04W 4/80; G05B 13/0265; G05B 15/02; G05B 2219/2639; G06Q 50/06; H02J 13/00004; H02J 13/0006; H02J 2310/10; H02J 2310/16; H02J 3/00; H02J 3/003; H02J 3/12; Y02B 90/20; Y02P 80/10; Y04S 20/00
See application file for complete search history.

(56) References Cited

U.S. PATENT DOCUMENTS

| | | | | |
|---|---|---|---|---|
| 2006/0276938 | A1* | 12/2006 | Miller | G05B 15/02 700/295 |
| 2007/0219645 | A1* | 9/2007 | Thomas | G05B 15/02 700/29 |
| 2010/0204849 | A1* | 8/2010 | Steffes | G05B 15/02 700/296 |
| 2012/0065805 | A1 | 3/2012 | Montalvo | |
| 2012/0200160 | A1* | 8/2012 | Pratt | B60L 53/16 307/48 |
| 2012/0296479 | A1* | 11/2012 | Millar | F24D 19/1048 700/277 |
| 2013/0178992 | A1* | 7/2013 | De Graeve | F24D 17/00 700/286 |
| 2014/0025216 | A1* | 1/2014 | Husen | G05B 13/02 700/295 |
| 2014/0188689 | A1 | 7/2014 | Kalsi et al. | |
| 2014/0324244 | A1 | 10/2014 | Musunuri et al. | |
| 2014/0337002 | A1 | 11/2014 | Manto | |
| 2016/0178239 | A1 | 6/2016 | Thornton et al. | |

FOREIGN PATENT DOCUMENTS

| | | |
|---|---|---|
| CN | 104022503 A | 9/2014 |
| CN | 104218683 A | 12/2014 |
| EP | 2573474 A1 | 3/2013 |
| EP | 2645532 A1 | 10/2013 |
| GB | 2472385 A | 2/2011 |
| GB | 2499190 A | 8/2013 |
| SE | 538564 C2 | 6/2016 |
| WO | 2012009724 A1 | 1/2012 |
| WO | 2012038194 A1 | 3/2012 |
| WO | 2012069497 A1 | 5/2012 |
| WO | 2012074478 A1 | 6/2012 |
| WO | 2013070159 A1 | 5/2013 |
| WO | 2013124302 A2 | 8/2013 |
| WO | 2014072793 A1 | 5/2014 |
| WO | 2014186845 A1 | 11/2014 |

OTHER PUBLICATIONS

Fjo De Ridder et al., On a Fair Distribution of Consumer's Flexibility Between Market Parties With Conflicting Interests, International Transactions on Electrical Energy Systems, 2016, 26, pp. 1961-1982.
Reihilde D'Hulst, Decentralized Coordinated Charging of Electric Vehicles Considering Locational and Temporal Flexibility, International Transactions on Electrical Energy Systems, 2015: 25(10), 2562-2575.
Michael C. Grant, Graph Implementations for Nonsmooth Convex Programs, Recent Advances in Learning and Control (a tribute to M. Vidyasagar), LNCIS 371, 2008, pp. 95-110.
Gideon Schwarz, Estimating the Dimension of a Model, The annals of Statistics vol. 6.2 (1978), pp. 461-464.
Jorma Rissanen, Modeling by Shortest Data Description, Automatica vol. 14.5 (1978), pp. 465-471.
Valerii Vadimovich, Fisher Information Matrix, see Fedorov, Theory of Optimal Experiments. Elsevier, 1972, pp. 1-301.
Carleton Coffrin, The QC Relaxation: A Theoretical and Computational Study on Optimal Power Flow. IEEE Transactions on Power Systems, vol. 31, No. 4, Jul. 2016, pp. 3008-3018.
Carleton Coffrin, C. H. (2015). DistFlow Extensions for AC Transmission Systems, arXiv preprint arXiv:1506.04773. 2015, pp. 1-20.
D. Menniti, A. P. A Local Market Model Involving Prosumers Taking Into Account Distribution Network Congestions. International Review of Electrical Engineering (IREE), 2014, pp. 976-985.
Duy Thanh Nguyen, Pool-Based Demand Response Exchange Concept and Modeling. IEEE Transactions on Power Systems, M.N., 2011, pp. 1677-1685.
Giovanni Brusco, Energy Management System for an Energy District with Demand Response Availability,. IEEE Transactions on Smart Grid, A.B, 2014, pp. 2385-2393.
Jesus Lago, Forecasting Day-Ahead Electricity Prices in Europe: The Importance of Considering Market Integration, Applied Energy (Under review), 211, 2018, pp. 890-903.
Jesus Lago, Forecasting Spot Electricity Prices: Deep Learning Approaches and Empirical Comparison of Traditional Algorithms, Applied Energy (Under review), 221, 2018, pp. 386-405.
Steven H. Low, Convex Relaxation of Optimal Power Flow Part I: Formulations and Equivalence. IEEE Transactions on Control of Network Systems, 2014, pp. 15-27.
Mousa Marzband, Experimental Evaluation of a Real Time Energy Management System for Stand-Alone Microgrids in Day-Ahead Markets, Applied Energy, 106, 2013, pp. 365-376.
Per Goncalves Da Silva, The Impact of Smart Grid Prosumer Grouping on Forecasting Accuracy and its Benefits for Local Electricity Market Trading, IEEE Transactions on Smart Grid, vol. 5, No. 1, Jan. 2014, pp. 402-410.
Pierre Pinson, Towards Fully Renewable Energy Systems: Experience and Trends in Denmark. CSEE Journal of Power and Energy Systems, vol. 3, No. 1, Mar. 2017, 26-35.
Anthony Papavasiliou, Analysis of Distribution Locational Marginal Prices. IEEE Transactions on Smart Grid, vol. 9, No. 5, Sep. 2018, pp. 4872-4882.
Sunyoung Kim, Second Order Cone Programming Relaxation of a Positive Semidefinite Constraint. Optimization Methods and Software, 2003, 535-541.
Ray D. Zimmerman, Matpower 4.0b2 User's Manual. Power System Engineering Research Center, 2010, pp. 1-102.
De Ridder F., Reinhilde D'Hulst Luk Knapen Davy Janssens "Electric Vehicles in the Smart Grid, Chapter in Data Science and Simulation in Transportation Research." Editors: Janssens D., Yasar A., Knapen L., pp. 340-363, IGI Global, 2013.
Low, S., Convex relaxation of optimal power flow: A tutorial. (2013). Bulk Power System Dynamics and Control-IX Optimization, Security and Control of the Emerging Power Grid (IREP), (pp. 1-15).
International Search Report and Written Opinion in corresponding PCT/EP2017/084667, dated Mar. 2, 2018.
European Search Report in corresponding European Application No. 16207020.5-1927, dated Oct. 2, 2017.
Stephen Boyd et al., "Distributed Optimization and Statistical Learning", Foundations and Trends in Machine Learning, vol. 3, No. 1 (2010), pp. 1-122.
Nicolo Cesa-Bianchi et al., "Prediction, Learning, and Games", Cambridge University Press, 2006, pp. 1-403.
Guillaume Le-Ray et al., "Evaluating price-based demand response in practice", IEEE Transactions on Smart Grid, 9(3), pp. 2304-2313.
Lingwen Gan et al., "Exact Convex Relaxation of Optimal Power Flow in Radial Networks", IEEE Trans. on Automatic Control, 2014, pp. 1-15.
Steven H. Low et al., "Convex Relaxations and Linear Approximations for Optimal Power Flow in Multiphase Radial Networks", arXiv: 1406.3054v1 [math.OC] Jun. 11, 2014, pp. 1-9.
R. Madlener et al., "An auction design for local reserve energy markets", Decision Support Systems 56 (2013) pp. 168-179.
Arkadi Nemirovski, "On Polyhedral Approximations of the Second-Order Cone", Mathematics of Operations Research, vol. 26. No. 2 May 2001, pp. 193-205.
Felix F. Wu, "Network Reconfiguration in Distribution Systems", IEEE Transactions on Power Delivery, vol. 4, No. 2, Apr. 1989, pp. 1401-1408.

(56) References Cited

OTHER PUBLICATIONS

Hirotugu Akaike, "A New Look at the Statistical Model Identification", IEEE Transactions on Automatic Control, vol. AC-19, No. 6, Dec. 1974, pp. 716-724.

Fjo De-Ridder et al., "Applying an Activity Based Model to Explore the Potential of Electrical Vehicles in the Smart Grid." Procedia Computer Science 19 (2013) pp. 847-853.

International Preliminary Report on Patentability in corresponding PCT Application No. PCT/EP2017/084667, dated Jul. 2, 2019.

\* cited by examiner

- Fig.6(2) -

HIERARCHICAL IMPLICIT CONTROLLER FOR SHIELDED SYSTEM IN A GRID

The present invention relates to a system or a method to at least partially steer systems, e.g. heating and/or cooling and clusters of systems, for example when the controller of the system is unknown or when the transfer function of the system is unknown. The present invention also relates to steering of the energy flow, e.g. heating/cooling/electrical energy, to provide energy to the system or the cluster of systems and preferably to manage common constraints, like capacity problems.

BACKGROUND OF THE INVENTION

It is known that heating systems can be controlled with distributed control strategies, for example:
Power supply network control system and method, Patent Application number EP3000161. Inventors: De Ridder F., Claessens B., De Breucker S.
De Ridder F., Claessens B., Vanhoudt D., De Breucker S., Bellemans T., Six D. and Van Bael J. "On a fair distribution of consumer's flexibility between market parties with conflicting interests", International Transactions on Electrical Energy Systems, DOI: 10.1002/etep.2188, 2016;
D'hulst R., De Ridder F., Claessens B., Knapen L., Janssens, D. 2015. "Decentralized coordinated charging of electric vehicles considering locational and temporal flexibility." International Transactions on Electrical Energy Systems, 25(10), 2562-2575.
De Ridder F., Reinhilde D'Hulst, Luk Knapen, Davy Janssens. "Electric Vehicles in the Smart Grid, Chapter in Data Science and Simulation in Transportation Research." Editors: Janssens D., Yasar A., Knapen L., IGI Global, 2013;
De Ridder F., Reinhilde D'Hulst, Luk Knapen, Davy Janssens. "Applying an Activity Based Model to Explore the Potential of Electrical Vehicles in the Smart Grid", Procedia of Computer Science, 19, 847-853, 2013].

Practically many systems cannot be steered, because the internal control system is shielded or hidden from access. This is often the case in Building Management Systems (BMS) or in large industrial plants, where many material flows are optimized. Many systems and cluster of systems cannot be steered, because the internal management of the system are shielded or because the internal management system is too complex or because the system is controlled manually. These internal management systems are important, because they guard internal constraints, like security of supply, comfort constraints, minimum/maximum temperatures, safety measures, like pumps will not work if pressure drops are detected which might indicate a leakage in a pipe.

Known control schemes for control of a cluster of devices are based on explicit knowledge of the underlying system. Even if self-learning model-free machine learning techniques are used, these can only steer some control parameters. In practice, cluster control schemes are difficult to implement for several reasons:
  There is often no access to the internal controller (e.g. because it is owned and operated by a private company.
  If the system changes, the controllers have to be changed, which is a time consuming job.
  If the configuration changes, e.g. devices are added or removed, the controller will have to be changed, which is a time consuming job.
  Many safety measures complicate the interference with controlling the real system.

For instance, until now, one way in which an external control component can influence a BMS's behaviour is by overriding the thermostat settings. In some special cases the BMS provider may offer an optional secondary (lower priority) controller input connector for such purposes, which leads to vendor lock-in, requires detailed knowledge and permission of the BMS provider, often requires costly cooperation and consultancy to be provided by the vendor, including maintenance fees. Overriding settings like thermostat settings can lead to dangerous situations, e.g. overheating.

It has been proposed to measure the thermal state inside houses and to steer the BMS accordingly. However, in many applications, this is difficult. In addition, many devices, such as heat pumps have their own internal management system, which can only partly be controlled. Often anti-pendle time constraints are active, e.g., if the heat pump is switched off, it will remain off for 20 minutes. It is hard to take such (unknown) constraints into account.

The massive integration of distributed energy resource (DERs) is changing the landscape of the energy systems. It has increased the variability and uncertainty of power systems in the whole energy supply chain. At the distribution level, incidents such as network asset congestion next to over/under voltage are becoming a new routine that distribution system operators (DSOs) have to deal with on a daily basis.

One solution to tackle the increasing uncertainty and emerging problem(s) is to increase the flexibility of the system. This can be done by enabling larger involvement of end-users to resolve the network operation limit violation in the low-voltage grids by implementing demand response (DR) programs. To ensure success of DR programs, the DSO is required to become more active and to play a coordinating role between DR resources (i.e., distributed flexible load and energy resource (DERs)). To do so, the DSO needs to be able to determine the minimum amount of flexibility that it requires to procure from every grid zone. It is known to provide a centralized demand response program that aggregates prosumers to minimize the reserve energy flows and to maximize net benefits in a day ahead energy market. A cooperation based algorithm that seeks network congestions alleviation via local energy exchange is known. Local energy storage systems can be incorporated to resolve network congestions. A competitive market clearing platform has been proposed that operates synchronously with the existing Day-ahead and Intra-day markets. A real-time local market for trading is known which focuses on real time balancing.

Clusters can be controlled by distributed control algorithms. A significant disadvantage is that a separate control unit needs to be developed for every individual device in the cluster. From an IT point of view, individual devices can be controlled by an agent. A significant disadvantage is that an agent needs to be written explicitly for every device. From a control perspective, a controller for the complete cluster can be developed, but this is a large task. In all cases, the design is not scalable, i.e. every change in the system requires new adaptations and developments in the control scheme. In addition, the control system must have access to every device. This is often not allowed.

Many buildings have BMS systems, which cannot be accessed, or heat pumps have an internal controller (for safety and other reasons), which cannot be accessed.

SUMMARY OF THE INVENTION

Embodiments of the present invention provide a method to at least partially steer systems, e.g. heating and/or cooling of devices, of buildings etc. and clusters of such devices and buildings etc., such as when the controller of the system is unknown or when the transfer function of the system is unknown. Embodiments of the present invention allow steering of the energy flow, e.g. heating/cooling/electrical energy, to provide energy to the system or the cluster of systems and preferably to manage common constraints, like capacity problems. Embodiments of the present invention make use of external sensors or data flows used, for example, by other controllers (and which are accessible).

Embodiments of the present invention provide an external controller e.g. suitable for retrofitting and for controlling a system having devices consuming hot or cold thermal energy and for consuming or generating electric power supplied by an electricity distribution grid, the electricity distribution grid having constraints and target objectives, at least one device having an internal controller for controlling the use of the hot or cold thermal energy and for receiving parameters as input to the internal controller wherein at least one parameter is accessible to the retrofitted external controller, the retrofitted external controller being adapted to manipulate the at least one parameter and to supply the manipulated parameter to the internal controller to alter the behaviour of the at least one device or the system having devices consuming hot or cold thermal energy, to meet at least in part the constraints and target objectives of the electricity distribution grid.

The retrofit external controller may be a standalone device or may be embedded in another electronic component. The retrofit controller may have memory (such as non-transitory computer readable medium, RAM and/or ROM), an operating system, optionally a display such as a fixed format display such as an OLED display, data entry devices such as a keyboard, a pointer device such as a "mouse", serial or parallel ports to communicate with other devices, network cards and connections to connect to a network.

The memory of the retrofit external controller can be used to store constraints and target objectives of the electricity distribution grid so that for example the retrofit controller can operate to manipulate the at least one parameter while taking into account constraints and target objectives of the electricity distribution grid. The serial or parallel ports for communication can be used to connect with a controller of the electricity distribution grid, e.g. of a DSO, in order to obtain and download constraints and target objectives of the grid. The retrofit external controller can be adapted to negotiate with one or more DSO of electricity distribution grids to agree account constraints and target objectives of one or more electricity distribution grids.

In embodiments of the present invention a manipulated parameter can be an accessible external data flow (e.g. channel) or an external sensor output_whose manipulation affects the decision made by the internal controller, thereby steering it. An additional e.g. retrofit external controller manipulates e.g. overwrites or overrules one or more external sensor measurements or outputs and/or one or more external data channels e.g. according to a previously learnt response function for altering or steering the internal controller operation to meet external objectives and constraints without overruling the internal controller, thereby guaranteeing that internal constraints of the controlled system can also be met.

The external sensor measurements or outputs and/or one or more external data channels are known to the retrofit controller, i.e. the retrofit controller is adapted to receive external sensor measurements or outputs and/or one or more external data channels. The response of the retrofit controller can be determined according to a previously learnt response function for altering or steering the internal controller operation to meet external objectives and constraints without overruling the internal controller, thereby guaranteeing that internal constraints of the controlled system can also be met.

The memory of the retrofit external controller can store which parameter is to be manipulated and may store which accessible external data flow (e.g. channel) or an external sensor output is to be manipulated. The retrofit external controller can be adapted to learn a response function for altering or steering the internal controller operation or the memory of the retrofit external controller can store one or more response functions for altering or steering the internal controller operation.

Accordingly, embodiments of the present invention can provide an external controller for controlling a system having one or more devices consuming hot or cold thermal energy and for consuming or generating electric power supplied by an electricity distribution grid, the electricity distribution grid having constraints and target objectives, at least one device having an internal controller for controlling the use of the hot or cold thermal energy and for receiving parameters as input to the internal controller wherein at least one parameter is accessible to the external controller, the external controller being adapted to manipulate the at least one parameter and to supply the manipulated parameter to the internal controller to alter the behaviour of the at least one device to meet at least in part the constraints and target objectives of the electricity distribution grid, wherein the at least one parameter which is manipulated is an accessible external data flow or external sensor output, whereby manipulation affects the decision made by the internal controller, thereby steering it. The external controller can be a retrofit external controller.

Hence, the additional external controller can manipulate and/or overwrite and/or overrule external sensor measurements and/or external data channels according to a previously learnt response function for altering or steering an internal controller operation to meet external objectives and constraints without overruling the controller, thereby guaranteeing that internal constraints of the controlled system are also met.

The external objectives can include constraints and objectives which are communicated from the grid control system to the retrofitted external controller. The external controller can comprise means for learning how the system reacts to changes in the external variables/parameters and also comprise means for constructing response functions which tell how the system will react or respond in any given situation. The external controller can use such a response function to estimate optimal implicit control signals to be applied to the internal controller by manipulating the external variables/parameters to meet the external objectives and constraints.

The internal controller can control the use of the hot or cold thermal energy and hence control the system of devices consuming hot or cold thermal energy.

Embodiments of the present invention do not interfere with an internal controller such as a controller of a BMS. Instead intercepts are only with sensor values such as the external temperature. By doing so, the efficiency of the overall system can be improved, but the individual BMS systems still provide the same guarantee of internal temperatures to remain within predefined ranges. To overwrite internal temperature sensors, or controller set-points can result in situations where a building becomes too cold and/or too warm. If the internal heat sensor is manipulated, alarms cancelled or thermostats overridden, the system can be heated to higher temperatures than were meant for the internal buffer controller. This may cause safety risks (the heater may start boiling, fires started, scalding of persons, etc.).

Embodiments of the present invention can control systems in electricity and/or heating or cooling networks, which are directly controlled by third parties or can be applied to individual units/buildings/devices. No access to the controller of the system is required, because its behaviour is influenced through some accessible external parameters. This presents a simple yet efficient way of harnessing the unknown inherent internal flexibility that can be provided by the system. Examples of such accessible controllable parameters are the outside temperature often used in building management systems or the availability of electricity used in controlling the production of industrial plants or the temperature and or flow rate in heating or cooling networks, the voltage, frequency, currents, etc. in electric distribution networks.

Embodiments of the present invention can control a system which can be incorporated in a larger cluster. Such a system can be steered so that it supports and helps in reaching objectives and constraints of the larger cluster. Objectives of a larger cluster can be achieved such as a minimization of losses, a minimization of costs, and constraints of the larger cluster such as limitations in the capacity of the grid, voltage, frequency and current stabilization in electric grids, material flows between industrial plants. Embodiments of the present invention can provide a control system with a hierarchical structure.

Embodiments of the present invention include a system comprising accessible external sensors and or data used by an internal shielded controller. This allows manipulation of the outputs of accessible external sensors and or data and hence control of the shielded internal controller.

Embodiments of the present invention provide a system and method for controlling a system that learns how the system reacts to external parameters and manipulates some of these parameters to steer the system. Embodiments of the present invention allow a system to be controlled to deal with other control problems, like stabilizing the electric and/or heating network.

Embodiments of the present invention provide an externally applied device used to modify the performance characteristics of a system. A device may be retrofitted to influence and modify the performance characteristics of a system.

Embodiments of the present invention also provide a system and method, which can be applied to a broad range of products such as:
  A steering mechanism for systems in a heating and/or cooling network
  A steering mechanism for systems in a distribution grid with limited capacity
  A steering mechanism for systems connected to a aggregator and/or balance responsible party in an electricity grid.
  A steering mechanism for power scheduling of large factories/companies.

Embodiments of the present invention provide a method which is able to partly take over internal controllers. It does this by manipulating e.g. over-ruling accessible external parameters that are used by the internal controller. For example, it can first learn how the internal controller reacts to changes in these external controllable parameters and next can manipulate, i.e. alter these parameters so that the internal controller reacts according to some global objectives and constraints. However, it changes only the external parameters of the internal controller. Safety measures taken by the internal controller are never overruled.

Embodiments of the present invention provide a method of manipulating a parameter which can be an accessible external data flow (e.g. channel) or an external sensor output whose manipulation affects the decision made by an internal controller, thereby steering it. One or more external sensor measurements or outputs and/or one or more external data channels are manipulated e.g. overwritten or overruled e.g. according to a previously learnt response function for altering or steering the internal controller operation to meet external objectives and constraints without overruling the internal controller, thereby guaranteeing that internal constraints of the controlled system can also be met.

Embodiments of the present invention can provide a method for controlling a system having devices consuming hot or cold thermal energy and for consuming or generating electric power supplied by an electricity distribution grid, the electricity distribution grid having constraints and target objectives, at least one device having an internal controller for controlling the use of the hot or cold thermal energy and for receiving parameters as input to the internal controller wherein at least one parameter is known to and accessible to the retrofit external controller, the retrofit external controller being adapted to manipulate the at least one parameter and to supply the manipulated parameter to the internal controller to alter the behaviour of the at least one device to meet at least in part the constraints and target objectives of the electricity distribution grid, wherein the at least one parameter which is manipulated is an accessible external data flow or external sensor output, whereby manipulation affects the decision made by the internal controller, thereby steering it.

Hence, the method manipulates and/or overwrites and/or overrules external sensor measurements and/or external data channels according to a previously learnt response function for providing signals to the internal controller that are adapted to alter or steer an internal controller operation to meet external objectives and constraints without overruling the internal controller, thereby guaranteeing that internal constraints of the controlled system are also met.

The external sensor measurements or outputs and/or one or more external data channels are known to the retrofit controller, i.e. the retrofit controller is adapted to receive external sensor measurements or outputs and/or one or more external data channels. The method includes a response of the retrofit controller being determined according to a previously learnt response function for altering or steering the internal controller operation by the retrofit controller being adapted to sending signals to the internal controller to alter its operation to meet external objectives and constraints without overruling the internal controller, thereby guaranteeing that internal constraints of the controlled system can also be met.

This method can be applied in heat networks, where an accessible external parameter would be the outside temperature; but the method can also be applied to systems, like industrial complexes, factories, etc., which react to instabilities in the electric grid, like lack in production or overproduction of energy, frequency variations, voltage variations, current or power variations or even variations in energy prices.

Experimental evidence illustrates that it is possible to take over the external parameters, that most systems do react to these external parameters and that the response behaviour can be learnt and can be used to steer the system according to some common objectives.

For a response system that seems to change with time a filtering such as a Kalman filter can be used to track the drifts. Other online learning tools can be applied as well.

Embodiments of the present invention allow the constraints and targets of the electrical grid to be transmitted dynamically to the retrofit external controller. To do this the distribution system can be simulated in embodiments of the present invention. The grid control can be performed by a Planner, Tracker, Forecaster and Building Agents. An aim of such embodiments is to minimize local RES curtailment, due to local grid problems. To identify these grid problems, a DSO agent can be implemented, based on load flow calculations, for example. This agent can determine whether flex activation is needed and ensures, preferably, that flex activation will not cause additional grid constraint violations. The distribution grid can be divided in local grid zone clusters and these clusters are controlled by a DCM.

Embodiments of the present invention allow optimization plans that take local grid problems, RES curtailment and load flow calculations into account. This allows distributed resources to contain the over-all system imbalances using the local resources.

Any of the embodiments of the present invention of an external retrofit controller can be implemented by a digital device with processing capability including one or more microprocessors, processors, microcontrollers, or central processing units (CPU) and/or a Graphics Processing Units (GPU) adapted to carry out the respective functions programmed with software, i.e. one or more computer programs. The software can be compiled to run on any of the microprocessors, processors, microcontrollers, or central processing units (CPU) and/or a Graphics Processing Units (GPU).

LIST OF TABLES

Table 1: Symbol list

Table 2: Symbol list

Figure 1:
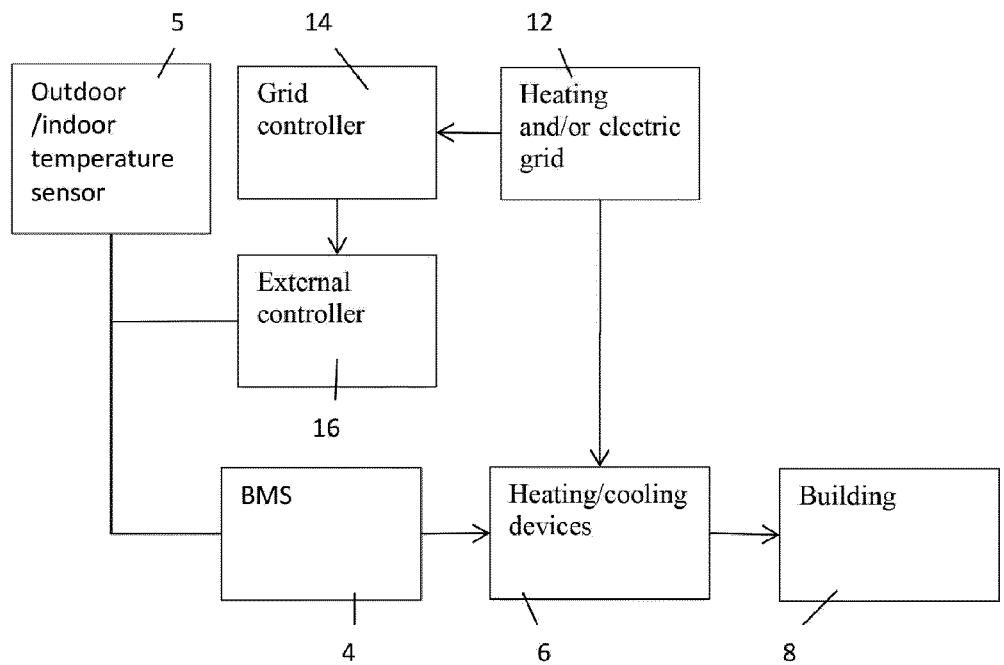
FIG. 1 shows a control system in accordance with an embodiment of the present invention.

Table 3: The Parameters for the Fictive Grid Example. r, x and b are series resistance, inductance and shunt susceptance of every connection.

Table 4: The Upper and the Lower Band of Active and Reactive Power and Flexibility. Active powers are in MW and reactive power are in MVAr.

Table 5: parameters used in the simulation.

Table 6: overview of the MAPE for each of the controllable buildings.

Definitions

Implicit control signal: a set of parameters, which are used by an internal controller and which can be manipulated by an external controller according to embodiments of the present invention BMS: Building Management System Internal controller: computer program or a device that steers a real local system. Examples are the BMS in a building or the operations control centre that steers an industrial plant.

External controller: computer program or device used to steer the internal controller to meet a set of common constraints, like capacity problems in the electric grid or heating grid.

System: device or cluster of devices with an internal controller.

External variables: accessible data outside the system, which influence the internal controller, like external temperature, time, day in the week, day in the year, economic activity, stock prices, energy prices, stability of the grid, etc.

Fixed external variables: external variables which are not, e.g. cannot be manipulated.

Controllable or accessible external variables: external variables that can be manipulated by the external controller, like energy price, the external temperature.

"Retrofitting" or "retrofit" refers to the addition of new technology or features to older systems, i.e. systems comprising legacy devices. A legacy device can be identified by its date of installation or from other records. A retrofitted device can be identified by its date of installation or from other records.

"Local security features" refers to legacy security features of a legacy storage vessel such as security based set-points, security cut-outs such as fuses, operation of thermostats, sounding of alarms, etc.

| Abbreviation | Full name |
| --- | --- |
| BRP | Balancing Responsible Party |
| DA | Day ahead |
| DCM | Dynamic Coalition Manager |
| DR | Demand Response |
| DSO | Distribution System Operator |
| LFC | Load Flow Calculation |
| UC | Use-Case |

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Embodiment 1: Thermal Systems

The present embodiment relates to heating or cooling networks providing heating or cooling to a building or a group of buildings. Each of these buildings or group of buildings is controlled by its own, private, BMS. This BMS ensures that the temperatures inside the building remain in well-defined ranges, that return temperature are optimized, so that heat pumps work well, that pressure on the pipes is monitored and that no water is circulated if pressure drops indicate leaks. In many cases, there is no access to the BMS system itself by third parties, so that direct steering of the use of heating or cooling and/or power consumption of the building is not possible. In many cases of heating and/or cooling of buildings, one of the external parameters that is used by a BMS is the external temperature. For example for a heating network, if the outside temperature drops, buildings will consume more heat and vice versa. In other cases, indoor temperature measurements are used by the BMS to control the heat consumption of the building.

This embodiment makes use of a manipulated or substitute outside values for external accessible control parameters of which external temperature is one example. This parameter is manipulated to steer the BMS system. For example, if the manipulated temperature is lower than the real temperature, the building may consume more energy at first, but receives a feedback from internal sensors that inside temperature are rising, so after a while the system may consume less than predicted. If the response of the system can be characterized, it can be steered by providing manipulated outside temperatures.

A heating or cooling device, which provides heat/cold to the heating network has a limited capacity, or networks pipes that transport the thermal energy have limited capacity, or a second heating/cooling installation needs to be switched on when demand exceeds a threshold, or that the heat is provided by a CHP/heat pump, which sells/buys its electric power on the electricity markets. This CHP/heat pump will take a position on the day ahead market and needs to produce/consume the promised electric power; or for clusters of buildings, some consume heat/cold and other produce excess heat/cold (e.g. data centres, industrial companies, supermarkets with cooling installations); or thermal energy storages are provided in the heating/cooling network In all these cases, it is desired to steer the buildings or the thermal energy storage units, so that the capacity is better used, more expensive devices are used less or the electric power of the CHP/heat pump is optimized, clusters of consumers and producers of heat/cold are better balanced, renewable energy sources are used as much as possible.

FIG. 1 shows a BMS 4 controlling the heating and cooling devices 6, e.g. of a building 8. These heating and cooling devices 6 are connected to a heating and/or electric distribution grid 12. In this embodiments the controller 14 of this grid cannot communicate directly with the BMS 4 (but the present invention is not limited thereto). For example, embodiments of the present invention provide a retrofitted system that overwrites the output signal of the external temperature sensor 5 and provides manipulated values of an outside temperature to the BMS 4. This allows an external retrofitted controller 16 to steer the BMS 4 and bring its consumption in agreement or closer in agreement with the objectives and constraints of the grid controller 14. The external retrofitted controller 16 may be a standalone device or may be embedded in another electronic component. The retrofit controller 16 may have memory (such as non-transitory computer readable medium, RAM and/or ROM), an operating system, optionally a display such as a fixed format display such as an OLED display, data entry devices such as a keyboard, a pointer device such as a "mouse", serial or parallel ports to communicate with other devices, network cards and connections to connect to a network.

The memory of the retrofit external controller 16 can be used to store constraints and target objectives of the electricity distribution grid so that for example the retrofit controller can operate to manipulate at least one parameter while taking into account constraints and target objectives of the electricity distribution grid. The manipulated parameter can be an output signal of an external accessible data flow (e.g. channel) or an external sensor output_whose manipulation affects the decision made by the internal controller, thereby steering it. An additional e.g. retrofit external controller manipulates e.g. overwrites or overrules one or more output signals of an external accessible data flow (e.g. channel), or external sensor measurements or outputs and/or one or more external data channels e.g. according to a previously learnt response function for altering or steering the internal controller operation to meet external objectives and constraints without overruling the internal controller, thereby guaranteeing that internal constraints of the controlled system can also be met. For example an output from an external temperature sensor 5 can be manipulated and manipulated values of an outside temperature can be provided to the BMS 4.

In other embodiments the serial or parallel ports for communication can be used to connect with a controller of the electricity distribution grid, e.g. of a DSO, in order to obtain and download constraints and target objectives of the grid. The retrofit external controller 16 can be adapted to negotiate with one or more DSO of electricity distribution grids to agree account constraints and target objectives of one or more electricity distribution grids.

Embodiment 2: Industrial Plants

Many industrial plants are organized in order to steer flows of goods and people. This optimization is often complex and is performed by a management team and/or by computers. One of the inputs to steer such complex processes is the availability of electricity and the constitution of the electric grid. It is expected that the availability of electricity will become more volatile in the future, due to a larger penetration of renewable energy sources. As a result, industrial plants will not only take the electricity prices into account in their decision processes but also the availability of electricity. It will become more beneficial for the industrial plant, the distribution grid and the transmission grid operator to control electric energy use more carefully.

Load synchronization may harm the distribution grid. When a lot of flexible sinks are connected to the same grid, they will all try to maximize their consumption. Most grids cannot cope with this, since it is assumed that peak consumption is spread in time.

In one aspect, embodiments of the present invention can optimize the energy availabilities on the energy market to secure (wherever possible) that grid constraints are not violated.

It is a difficult task to examine how each individual industrial plant will react to every possible electricity availability and electricity price profile. Nevertheless, an operator will need to gain access to the energy markets and/or to steer the energy consumption in order to meet common constraints. The complete process of an industrial plant and the decisions of its management are difficult to model. Embodiments of the present invention use response functions to predict the reaction of such an industrial plant.

Embodiment 3: Recursive and Hierarchical Applications on Industrial Sites

Figure 2:
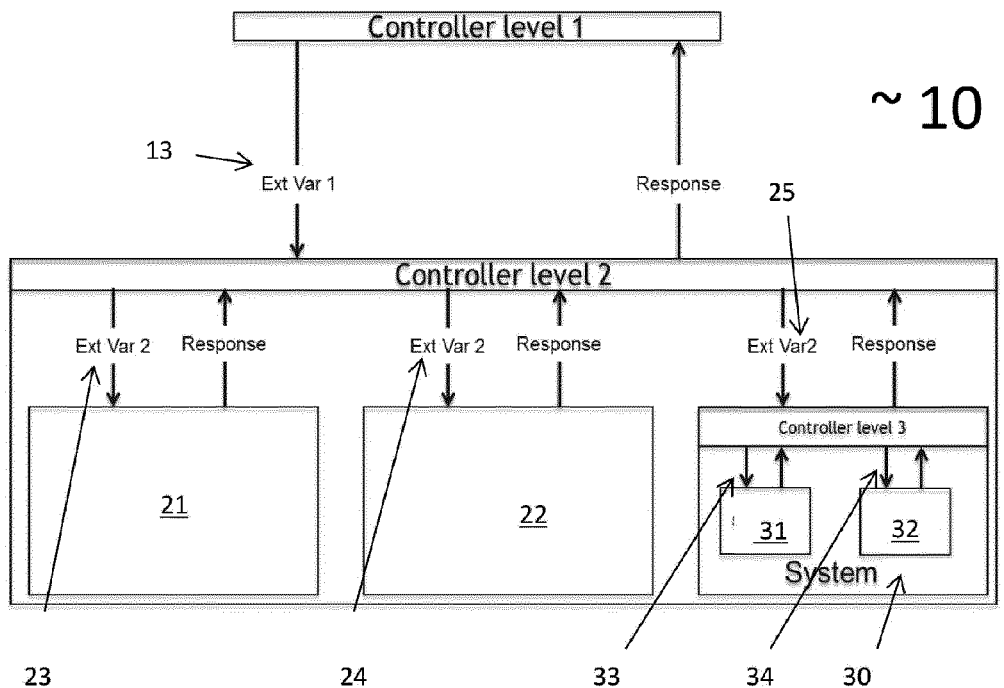
FIG. 2 shows a hierarchical control system in accordance with an embodiment of the present invention.

Embodiments of the present invention can be applied recursively to industrial plants and their sub-units down to the level of individual devices if necessary. Embodiments of the present invention also allow for multiple industrial sites (e.g. in the same region) to be optimized together in a hierarchical fashion—See FIG. 2. The embodiment of FIG. 2 shows industrial site/connection of sites 10 having three controller levels: controller level No. 1, controller level No. 2 and controller level No. 3. These can be retrofitted controller levels. Each system, such as systems 21, 22, 31, 32, has an accessible external variable 23, 24, 33, 34 which can be manipulated such as the value of an external temperature sensor. Each retrofitted controller level 1, 2 also has an accessible external variable 13, 25 which can be manipulated such as the value of an external temperature sensor, in accordance with an embodiment of the present invention. Thus a retrofit controller at controller level 1 can manipulate the value of the accessible external variable 13 such as the value of an external temperature sensor in order to control a further controller at controller level 2. The further controller at controller level 2 can be a retrofitted controller which in turn is able to control systems 21 and 22 by manipulating accessible external variables 23, 24 of systems 21 and 22 respectively. This controller at controller level 2 can also control the controller at controller level 3 by manipulating external accessible variable 25 such as the value of an external temperature sensor. The further controller at controller level 3 can be a retrofitted controller which in turn is able to control systems 31 and 32 by manipulating accessible external variables 33, 34 of systems 31 and 32 respectively. Such a hierarchical arrangement of retrofitted controllers allows for several levels of abstraction, and the planning of resources at each level 1, 2, 3 can be done independently of the other lower levels. The only factors relevant to each level are the accessible external variables for controlling lower level controllers and systems that can be controlled by manipulation. Manipulated adjustments of each accessible external variable 13, 23, 24, 25, 33, 34 will result in responses from the lower level controllers or systems to these changes in the variables. These responses are therefore feedback which can be supplied to the retrofitted controllers to allow them to optimize their performance. This allows for steering a hierarchical system with complex interactions in an efficient way. An example of this is a cluster of industries as shown in FIG. 2. Each industrial premises or complex handles several systems with internal control units, and an aggregator of the industry systems and controllers, e.g. at controller level 1 can carry out global tasks such as making electrical or heating or cooling energy available for the entire industrial site/connection of sites 10 with several levels of constraints to satisfy simultaneously.

Embodiments of the present invention can be applied to a system of FIG. 2 which has or can have an internal control system having its own internal controller. In accordance with embodiments of the present invention the internal control systems need not be influenced directly from external but instead are influenced by manipulation of accessible external data paths or sensor outputs. A system of FIG. 2 can be connected to another external system, like a distribution grid, and that external system will have certain objectives, like cost minimization, and certain constraints, like a limited capacity. An advantage of the present invention is that a retrofitted control system is provided that is able to satisfy at least partly new objectives relating to more than just the local systems. This allows adaption of the systems to new objectives, e.g. introduced by use of renewable energy sources.

Embodiments of the present invention allow steering of the internal systems according to these external objectives and constraints without overruling the internal controllers. This can secure or guarantee that internal constraints, like security of supply, are met while the system is steered according to the external objectives and constraints.

Embodiments of the present invention do not need any knowledge or representation of the actual control parameters and can thus be applied to systems, which are not accessible from external. Rather than steering some control variables, embodiments of the present invention manipulate some of the accessible data on which the internal controller of the BMS 4 of FIG. 1 or of each of systems 21, 22, 31, 32 of FIG. 2 bases its decision.

Advantages of embodiments of the present invention can be any one, some or all of the following:
- embodiments of the present invention can be applied to a broader range of controllers;
- embodiments of the present invention can be used in a hierarchical controller (see FIG. 2). The internal controller itself can be an implicit controller.
- embodiments of the present invention need less data and knowledge about the system to be controlled
- embodiments of the present invention can still guarantee that all internal safety measures are fulfilled.
- embodiments of the present invention add on to the existing implicit controllers. Therefore the process operator will not have to replace the existing controller.
- embodiments of the present invention avoid vendor lock-ins, control-system vendor's or manufactory's cooperation is not required
- embodiments of the present invention are robust to replacement/firmware updates of the existing controllers embodiments of the present invention are less intrusive to the existing installation, no access to control hardware is necessary embodiments of the present invention allow non-intrusive integration of control hardware from multiple competing vendors Embodiments of the present invention provide a means to steer systems or clusters of systems, where there is no access to the internal control mechanisms of these system(s).

Embodiments of the present invention can steer systems that evolve in time, that are controlled by complex processes, like complex computer programs, human interferences etc. and that are controlled by hardware/software from competing providers without requiring world-wide open control standardisation efforts.

Embodiments of the present invention can require that some external sensors of the internal controller be replaced, or at least the measurement value of such sensors are overwritten.

Methods such as machine learning methods may be applied to find out which of the various (types of) potentially accessible sensors should be selected for replacement and manipulation, e.g. the one whose manipulation reveals the most interesting potential for influencing the optimisation objective.

Secondly, machine learning methods can be applied to learn the responses of the system being controlled.

Thirdly, these responses can be embedded in an implicit controller.

Embodiments of the present invention overrule external sensor measurements. Embodiments of the present invention allow the internal controller of a system to continue in its control function. Embodiments of the present invention manipulate some external data on which the internal control is based rather than replacing the existing controller by a controller with other features but the same safety standards. Embodiments of the present invention steer the controller in a desired direction, without jeopardizing safety measures, nor security of supply.

Embodiments of the present invention work best with an internal controller that bases its action on at least one external parameter, like an availability of energy, an outside temperature, the temperature and flow rate in a heat network, the state (voltage, frequency, currents, etc.) of an electrical grid. Hence a sensor or dataflow is intercepted, this information is manipulated and this affects the decision made by the internal controller. The response of the system to this manipulation is learnt, from which embodiments of the present invention can compute how the system can be steered by a series of manipulated data.

Embodiments of the present invention can make use of a response function, for example a linear response function which is linear in the parameters and linear in the manipulated parameters. This allows embodiments of the present invention to use such a response function as an affine function in the external controller. This property is useful so that a numerical robust solution to the external objectives and constraints can be computed. However, response functions which are non-linear, like convex functions which are convex in both the system parameters and convex in the control parameters or nonlinear functions, which have non-linear relations wrt the system parameters and/or control parameters can also be used. If these are used, one can no longer guarantee that the controller functions optimally (in a mathematical sense: convergence may be slower or absent, local minima may occur in the search algorithms, etc.).

Embodiments of the present invention provide a forecaster to estimate the energy consumption of a network for the next time period e.g. $24h$—i.e. a reference consumption.

A Planner which gives the control objectives (peak shaving/elec. market interaction/cell balancing), can determine an optimal cluster consumption profile that can be achieved, taking into account this forecast and the response functions of the buildings.

A Dispatcher-Tracker is provided which makes use of individual control signals necessary to follow/track the optimal consumption profile.

Further embodiments of the planner and the tracker are given below and described with reference to FIGS. 5 to 18.

A digital processing device such as a computer and some hardware can be used to manipulate the outputs of sensors or other data channels. A computer and some hardware can be used to replace data-flows. A digital processing device such as a computer and some hardware can be used to provide an indoor written forecaster, or use can be made of external forecasts. Some external variables are manipulated in order to steer the system in the desired direction. Embodiments of the present invention learn from the system, e.g. controllable buildings how they respond to manipulated temperatures.

The reaction of the system, i.e. by responses is learned by a computer and the response of the system is incorporated in an external control, which can be used for its own objectives. These response functions are used to control those buildings and to avoid peak demand.

Figure 3:
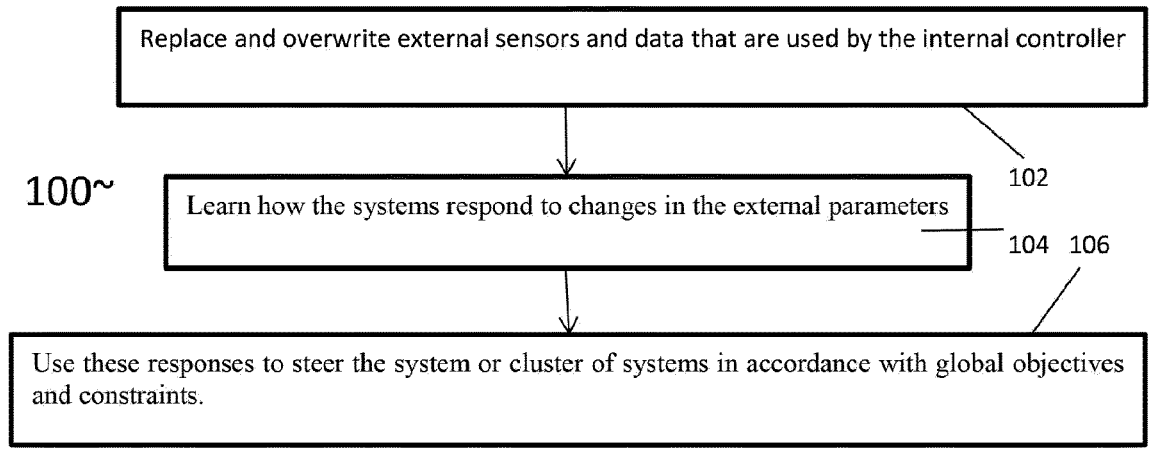
FIG. 3 shows a method flow in accordance with an embodiment of the present invention.

An embodiment of the present invention is a method 100 (see FIG. 3):

1. One or more accessible sensors or data channels are identified so that external signals from these sensors or data channels can be overwritten (step 102). An internal controller often depends on some external data, like weather data, forecasts, outside temperature, energy availability. These internal systems have their own independent control system, which cannot be entered. But these external data influence the decision made by the internal controller. By overruling these external data flows and/or sensors, the internal controller is steered.

2. how the system responds to changes in these external parameters is learnt (step 104). This part is based on, for example machine learning techniques, which relates the dynamic response of the system to changes in the features. These features include the manipulated data. It is very well possible that the response function is complex, time varying, etc.

3. this response function is used to steer the system according to external objectives and constraints (step 106). This allows external retrofitted controllers to be configured which can steer internal systems in a grid. Steering the internal controllers can be done by optimization methods, like convex optimization, multiple shooting, etc.

An external retrofitted controller may be used which can be a standalone device or may be embedded in another electronic component. The retrofit controller may have memory (such as non-transitory computer readable medium, RAM and/or ROM), an operating system, optionally a display such as a fixed format display such as an OLED display, data entry devices such as a keyboard, a pointer device such as a "mouse", serial or parallel ports to communicate with other devices, network cards and connections to connect to a network.

The memory of the retrofit external controller can be used to store constraints and target objectives of the electricity distribution grid so that for example the retrofit controller can operate to manipulate at least one parameter while taking into account constraints and target objectives of the electricity distribution grid. The manipulated parameter can be an output signal of an external accessible data flow (e.g. channel) or an external sensor output_whose manipulation affects the decision made by the internal controller, thereby steering it. An additional e.g. retrofit external controller manipulates e.g. overwrites or overrules one or more output signals of an external accessible data flow (e.g. channel), or external sensor measurements or outputs and/or one or more external data channels e.g. according to a previously learnt response function for altering or steering the internal controller operation to meet external objectives and constraints without overruling the internal controller, thereby guaranteeing that internal constraints of the controlled system can also be met.

For example an output from an external temperature sensor 5 can be manipulated and manipulated values of an outside temperature can be provided to the BMS 4. An external controller for retrofitting according to embodiments of the present invention can be improved by using more complicated machine learning techniques than simple linear response models. More complicated machine learning techniques can be convex or nonlinear models, including machine learning models, like reinforcement learning, vanilla neural networks, convolutional neural networks, LSTMs, decision trees, and many more.

Embodiments of the present invention differ from other technologies because they do not need to take over the control of the local system. Instead they are an add-on to existing controllers.

Embodiments of the present invention learn the response of a system. So even if the system or its behaviour changes in time, this can be tracked.

Embodiments of the present invention are scalable and composable. The internal system with its internal controller can be another implicit controller, which steers several devices with its own local objectives and constraints.

Embodiments of this invention can be applied to steer devices in a heating or cooling network.

Embodiments of this invention can be applied to steer devices in an electric distribution network.

Embodiments of this invention can be applied to steer devices in a portfolio of a BRP.

Embodiments of the present invention provide a steering system with one, some or all of:
which can learn how a system reacts to changes in external parameters, e.g. a building will react to manipulated temperatures, a plant will react to changes in electricity availability, etc.
which will construct a response function to model reactions of the controlled system
which will determine implicit control parameters to be used to learn the response function, e.g. the quick or the fastest, the accurate or most accurate and/or the precise or most precise
which will use this response function for its own objectives
which will be able to learn changes in the response function.

A system with which embodiments of the present invention can be used, consists of or comprises a device or a set of devices and an internal controller. It is assumed that there is no access to controlling parts of the internal controller. The device or set of devices is/are connected to an electrical and/or a thermal grid, which provides electric power. The internal controller steers the devices based on, for example
(i) A set of fixed external parameters;
(ii) A set of manipulated parameters. The internal controller does not and usually cannot distinguish controllable external parameters from fixed external parameters.

An embodiment of the present invention can be described as follows. Device(s) are connected to an electrical and or heat network and consume energy and/or dispense energy. This network is subject to a series of constraints, like a maximum power, equilibrium between consumption and production, etc. The grid control system makes sure or aims to make sure that these constraints are met. In a heat network, the grid control system may simply steer the heat production; in an electric grid, a large series of reserve capacity, energy market mechanisms, load flow calculations are performed to keep the grid stable. An internal controller of a device is hardly aware of the state of the grid controller and aims solely at meeting internal constraints, like safety of the installation, meeting comfort settings, etc. The aim of the external controller, e.g. retrofitted controller according to any of the embodiments of the present invention is to link the grid control system to the internal controller. Since the internal controller has no direct interface, this is difficult, but not impossible. In embodiments of the present invention one accessible external variable or some of the external variables can be manipulated to steer the internal controller. This is precisely the role of the external controller. By manipulating one accessible external variable or some external variables, it can (partly) steer the system so that it better react to situations in the grid.

Figure 4:
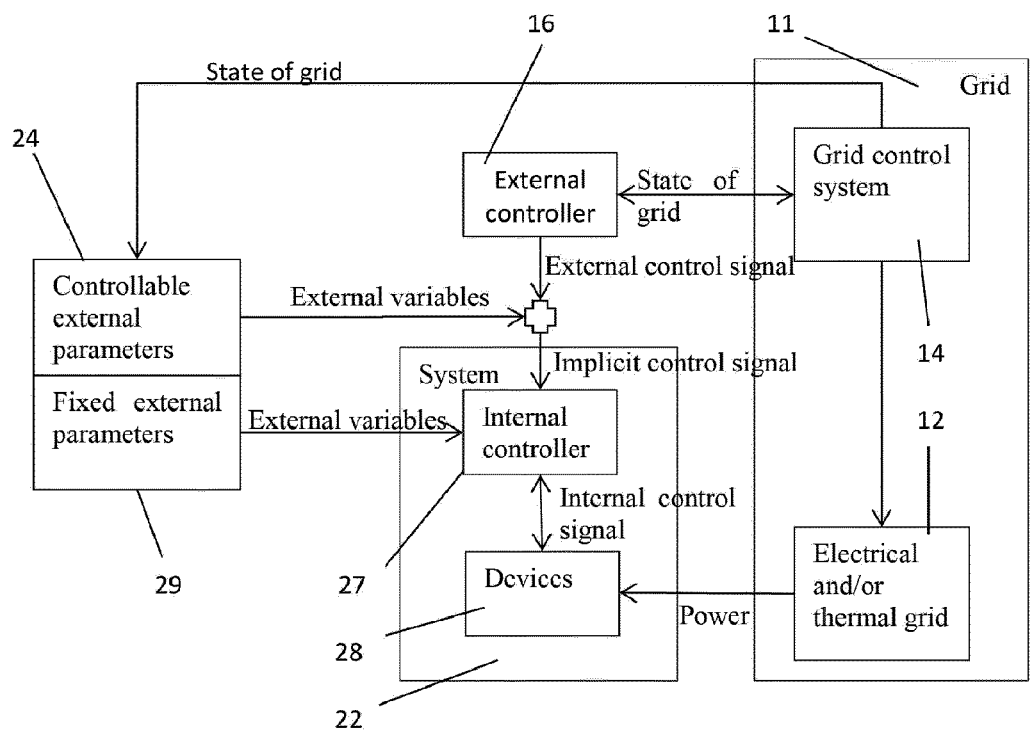
FIG. 4 shows a control system in accordance with an embodiment of the present invention.

An embodiment of the present invention relates to a system 22 with a control system including an internal controller 27 as shown schematically in FIG. 4. The control system and the internal controller 27 cannot be accessed, adapted or adjusted directly by third parties. The internal controller 27 of system 22 receives values of external parameters 29 which are not accessible nor adjustable by third parties. Without the amendments of embodiments of the present invention, the internal controller system 22 is connected to another system, like a thermal and/or electrical distribution grid 11, and this grid 11 has certain objectives, like cost minimization, and certain constraints, like a limited capacity. This embodiment of the present invention allows steering of the system 22 according at least partly to these external objectives and constraints without overruling the internal controller or internal controllers 27. This means that there is a guarantee that internal constraints, like security of supply, are met while the system 22 is steered according to the external objectives and constraints.

External controller 16 manipulates values of controllable and accessible external parameters 24 such as external temperature and delivers these manipulated values to the internal controller 27 via an implicit control signal. The internal controller can also receive fixed external parameters 29 which are not manipulated. The internal controller controls devices 28 of system 22 via internal control signals. Electrical and/or heating or cooling power to the devices 28 is provided by an electrical and/or thermal grid 12 which can be part of a larger grid system 11. The grid system 11 has a grid control system 14 in communication with the retrofitted external controller 16. So the state of the grid 11 and constraints and objectives of the grid controller 14 are known to the external controller 16.

In order to steer the system 22 according to the demands of the grid controller system 14, the external controller 16 preferably has tools to forecast how the system 22 will react when the controllable external variables 24 are manipulated. Therefore the external controller 16 needs to learn how the system will react to changes in the external variables 24. This learning consists of two phases. In the first phase, it will dialogue with the system 22 and will learn what external parameters to select to retrieve as much information as possible. In the second phase, it will construct response functions, which tell how the system 22 will react or response in any given situation.

The response function is a function that forecasts the energy consumption as function of a series of features. These features contain (at least some of) the external variables, with possibly some additional variables and the manipulated external variables 24. The external controller 16 can use the response function to estimate optimal implicit control signals, which can be applied to the internal controller 27 of system 22.

The response function can be constructed with identified parameter estimation and model selection. A dialogue with the system 22 can be optimized. The response function can be generalized, so that time varying response can be handled too.

The external retrofitted controller 16 may be a standalone device or may be embedded in another electronic component. The retrofit controller 16 may have memory (such as non-transitory computer readable medium, RAM and/or ROM), an operating system, optionally a display such as a fixed format display such as an OLED display, data entry devices such as a keyboard, a pointer device such as a "mouse", serial or parallel ports to communicate with other devices, network cards and connections to connect to a network.

The memory of the retrofit external controller 16 can be used to store constraints and target objectives of the electricity distribution grid so that for example the retrofit controller can operate to manipulate at least one parameter while taking into account constraints and target objectives of the electricity distribution grid. The manipulated parameter can be an output signal of an external accessible data flow (e.g. channel) or an external sensor output_whose manipulation affects the decision made by the internal controller, thereby steering it. An additional e.g. retrofit external controller manipulates e.g. overwrites or overrules one or more output signals of an external accessible data flow (e.g. channel), or external sensor measurements or outputs and/or one or more external data channels e.g. according to a previously learnt response function for altering or steering the internal controller operation to meet external objectives and constraints without overruling the internal controller, thereby guaranteeing that internal constraints of the controlled system can also be met. For example an output from an external temperature sensor 5 can be manipulated and manipulated values of an outside temperature can be provided to the BMS 4.

Features of the Response Function

The aim of the response function is to forecast the energy consumption, e.g. electric and/or heat/cooling, based on some known variables which variables will be called features. The forecast itself is called the output. A subset of the features is the implicit control signals provided by the external controller 16 to internal controller 27.

Possible content of the feature vector are (non-limiting and no-exhaustive list):
The day in de week
The day in the year and public holidays
The hour in the day
The economic activity
Stock market prices
Commodity prices
Weather forecasts
Energy consumption forecasts
Energy market prices
Energy market forecasts.
. . .
An implicit control signal that has been used in the recent past
Implicit control signal
The feature vector is called f and the output y.

Response Function

The response function is the mathematical relation between the features and the output. The most obvious relation is a linear relation, whereby the output is a simple linear combination of all features (and optionally a constant). The main advantage of a linear relation is that the estimation of the parameters is a stable process with a lot of known properties, which can be used to check the solution. Besides, simple non-linearities can be encoded as linear relations into the feature table.

The nature of the response function can be nonlinear, e.g. which can be the case if the system is saturated. For example, a factory may react to an increase in the availability of electricity, e.g. caused by a drop by 50% in the availability of electricity. For example the factory could switch on all its devices. If there is a further drop in availability, e.g. a further drop of another 50%, there will not be any additional reaction, since all devices have already been switched on. Such a saturated response is difficult to model with linear response. In the machine learning community, a broad range of solutions have been proposed, like support vector machines, neural networks, logistic regression and many more to deal with this situation.

A response function can be written as follows $$H(f)=y \tag{1}$$

with H a function of the features f (1×M vector) and y a vector with the energy consumption in the future (N×1). This simplifies to $$f\theta=y \tag{2}$$

in the linear case (with θ a M×N matrix).

This response is subject to two constraints

1. Time Invariance

The effect of an implicit control signal (e.g. from external controller 16 to internal controller 27) at time t on the consumption at time t+n must be the same as its effect at time t+m on the consumption at time t+n+m, with n and m both positive numbers.

$$\frac{\partial y_{t+n}}{\partial \theta_t} = \frac{\partial y_{t+n+m}}{\partial \theta_{t+m}}$$

2. Anti-Causality

In practice it is not possible that an implicit control action at time t influence the consumption at time t−n with n a positive number.

$$\frac{\partial y_{t-n}}{\partial \theta_t} = 0$$

Estimating Parameters

It is assumed that a time series of the features and of the output are available. These can be gathered, by applying implicit control signals and measuring the real responses of the system.

The estimation of the parameters depends on the method used. For most machine learning techniques, the parameter estimation methods are available. For the linear case, a least square estimator can be used to identify the θ matrix $$\hat{\theta} = \min_{\theta}(f\theta - y)^2 \qquad (3)$$

Subject to $$G_{time-invariance}\theta = 0$$

$$G_{anti-causality}\theta = 0$$

These equations can easily be solved with publicly available software, see for example Michael Grant and Stephen Boyd. CVX: Matlab software for disciplined convex programming, version 2.0 beta. http://cvxr.com/cvx, September 2013; Michael Grant and Stephen Boyd. Graph implementations for nonsmooth convex programs, Recent Advances in Learning and Control (a tribute to M. Vidyasagar), V. Blondel, S. Boyd, and H. Kimura, editors, pages 95-110, Lecture Notes in Control and Information Sciences, Springer, 2008. http://stanford.edu/~boyd/graph_dcp.html.

Identification of the Model

By "identification of the model", is meant that rules are provided which identify in a set of features, which features are relevant and which are not. It is not always a good idea to use as many features as possible, since some features will not improve the forecast. However, the parameters associated with these features, have some uncertainty and this uncertainty will lower the precision of the forecast. For that reason, it is better to exclude these features. There are some rules to identify the significant features.

One way to identify which features improve the forecast and which features are not significant, is by the use of information criteria, like AIC see for example Akaike, Hirotugu. "A new look at the statistical model identification." IEEE transactions on automatic control 19.6 (1974): 716-723.], BIC [Schwarz, Gideon. "Estimating the dimension of a model." The annals of statistics 6.2 (1978): 461-464.], MDL [Rissanen, Jorma. "Modeling by shortest data description." Automatica 14.5 (1978): 465-471.], etc. These are able to propose a well-balanced trade-off between precision and accuracy, solely based on the residual cost function C, the number of observations $N_{obs}$ and the number of free parameters $N_{par}-N_{con}$ $$MDL = C \exp\left(\frac{\ln(N_{obs})(1 + N_{par} - N_{con})}{N_{obs} - N_{par} + N_{con} - 2}\right) \qquad (4)$$

In practice, one optimizes the parameters for every possible set of features and selects that set with the lowest criteria. Additionally, other feature selection criteria can be used, simplest being to not include two features that are highly correlated, as they are likely to provide the same underlying information.

The Dialogue with the System

In real applications, the method can begin with the retrofitted controller 16 manipulating a single feature and receiving a response from the system. Based on both, construction of a response function can be commenced. In the next iteration, new features are provided/manipulated and a new response is received. This procedure can be repeated until the system is well described. This dialogue with the system can be optimized; e.g. implicit control signals can be identified that lead faster to precise response models. It can be important to learn the response of the system as quickly and as accurately and precisely as possible. It can be proven that any other dialogues will learn slower.

Formally, implicit control signals can be found that maximize the Fisher Information matrix, see Fedorov, Valerii Vadimovich. *Theory of optimal experiments*. Elsevier, 1972. The Fisher information matrix is given by $$FIM = f^T \Sigma^{-1} f \qquad (5)$$

With Σ the covariance matrix of the output. If we assume that the measurement uncertainty on the output is independently identically distributed noise, this covariance matrix is a diagonal matrix, with a constant diagonal $$FIM = \sigma^{-2} f^T f \qquad (6)$$

The aim is to maximize this FIM, $$u = \max_u f^T f \qquad (7)$$

The constant is dropped, since it does not influence the maximization. It can be posed as is a convex problem which can be solved by commercially available solvers, like cvx, see Michael Grant and Stephen Boyd. CVX: Matlab software for disciplined convex programming, version 2.0 beta. http://cvxr.com/cvx, September 2013; Michael Grant and Stephen Boyd. Graph implementations for nonsmooth convex programs, Recent Advances in Learning and Control (a tribute to M. Vidyasagar), V. Blondel, S. Boyd, and H. Kimura, editors, pages 95-110, Lecture Notes in Control and Information Sciences, Springer, 2008. http://stanford.edu/~boyd/graph_dcp.html. Most likely, the implicit control signal u, is a constraint. These Constraints can Easily be Integrated.

Time Varying Systems/Kalman Filter

The relation between the features and output may vary slowly in time. This does not need to be taken into account explicitly in the model but can be dealt with by filtering. One way to deal with this is by implementing e.g. a Kalman filter, which will track the changing parameters.

The Kalman updating scheme for the linear model is $$K = \frac{\Sigma_\theta f^T}{\Sigma_\theta + f(\Sigma_\theta + \Sigma_Q)f^T} \qquad (8)$$

$$\theta^+ = \theta - K(f\theta - y) \qquad (9)$$

$$\Sigma_\theta^+ = (1 - Kf)\Sigma_\theta \qquad (10)$$

With K the Kalman gain, $\Sigma_\theta$ the covariance matrix of the response model's parameters, $\Sigma_Q$ the covariance matrix of the mystic process noise, $\theta^+$ the updated parameters and $\Sigma_\theta^+$ the updated parameter covariance matrix.

Control Problem/Solution

The external controller 16 can use the response function to steer the system 22 such that grid objectives and constraints can be met. Many objective functions are possible as will be described below.

In general terms, an objective function can be expressed in function of the electric and heating energy consumptions, E and Q $$g(E,Q) \quad (11)$$

If the only concern is to keep the energy consumption in some bounds, $$g(E,Q)=1. \quad (12)$$

If the heat is to be provided by a cheaper installation (or one using renewable energy sources) such as a pellet installation and a more expensive (e.g. fossil fuel) oil installation, $$g(E,Q)=Q\lambda^{pellet}+\max(Q-Q_{max}^{pellet},0)(\lambda^{oil}-\lambda^{pellet}) \quad (13)$$

With $\lambda^{pellet}$ the energy price of the pellet installation, $Q_{max}^{pellet}$ the maximum energy production of the pellet installation (or renewable energy source) and $\lambda^{oil}$ the energy price of the (e.g. fossil fuel) oil installation. The max operator returns $Q-Q_{max}^{pellet}$ whenever this is positive and zero otherwise.

If the energy consumption is bought on the day ahead market and the system is responsible for its imbalance position $$g(E,Q)=E^{DAM}\lambda^{DAM}+\min(E^{DAM}-E,0)\lambda^-+\max(E^{DAM}-E,0)\lambda^+ \quad (14)$$

With $E^{DAM}$ the energy bought on the day ahead market, $\lambda^{DAM}$ the price of energy on the day ahead market and $\lambda^-$ and $\lambda^+$ respectively the negative and positive imbalance price. The min operator returns $E^{DAM}-E$ whenever this is negative and zero otherwise and the max operator returns $E^{DAM}-E$ whenever this is positive and zero otherwise.

Any objective that can be formulated mathematically can be written as an objective function and can be used.

The overall aim of the external controller is solve the follow problem $$\min_{(E,Q)} g(E, Q) \quad (15)$$

Subject to $$[F_E, u_E] = f_E$$

$$[F_Q, u_Q] = f_Q$$

$$f_E \Theta_E = E$$

$$f_Q \Theta_Q = Q$$

$$\underline{E} \leq E \leq \overline{E}$$

$$\underline{Q} \leq Q \leq \overline{Q}$$

$$\underline{u_E} \leq u_E \leq \overline{u_E}$$

$$\underline{u_Q} \leq u_Q \leq \overline{u_Q}$$

With $F_E$ the features that are used, but are not manipulated and $u_E$ the features that can be manipulated.

The subscript E denotes that these are used to steer electric energy, the subscript Q denotes thermal energy.

The bar below a symbol means the lower bound and the bar above a symbol means its upper bound.

Results

Example: Heat Network

The system has about 175 buildings connected to a heat network. Ten of them can be steered, the remaining buildings can only consume energy. These ten buildings represent however about half of the annual heat consumption of the network. The heat is provided by two installations. The first is a wood chip (or one using renewable energy sources) boiler installation which can provide 2.7 MW. If this is not sufficient to heat all buildings an oil-based (or other fossil fuel) installation can provide another 3 MW. It is not possible to steer any of the buildings directly, but it is possible to learn how they react to manipulated external temperatures and use these accessible sensors to steer the buildings. The controlling mechanism could have been used to minimize the costs of heating, but is only used to avoid the use of the oil-based installation. In this way, $CO_2$ emissions are saved. The control algorithm was tuned by using the parameter setting as given in Table 5. Note that the costs of the wood chip boiler installation have been set equal to zero. A consequence of this choice is that it does not matter to the objective function how much heat is provided by the wood chip boiler installation.

TABLE 5

| parameters used in the simulation | |
|---|---|
| Maximum heating (kW) | 1.5 + 1.2 |
| Maximum temperature deviation (° C.) | 10 |
| Lowest temperature deviation (° C.) | −10 |
| Cost of heating (€/kWh) | 30/1000 |
| Cost of additional heating (€/kWh) | 100/1000 |

Training

Data of controllable buildings are datasets that can be split in three parts: a training set, a validation set and a test set. The training set is used to match the response models on the test set. The validation set has been used to check the quality of the response models and the test set is used to steer the heat network.

It can be noticed that the quality of the forecast does not decrease in time. Table 6 gives an overview of the Mean Average Prediction Error (MAPE) up to 24 h ahead S for all controllable buildings. These MAPES vary between 10 and 30%, which is reasonably good, hence a method according to embodiments of the present invention can identify to a reasonable extent the response of a building to a manipulated outside temperature. This response function can be used to steer a cluster of buildings according to some common constraints and objective functions.

TABLE 6

| overview of the MAPE for each of the controllable buildings. | |
|---|---|
| Building | MAPE (%) |
| F_12 | 9 |
| L_5 | 13 |
| L_10 | 30 |
| S | 19 |
| S_22 | 14 |
| S_68 | 22 |

TABLE 6-continued overview of the MAPE for each of the controllable buildings.

| Building | MAPE (%) |
|---|---|
| Sm_5 | 24 |
| T_vag_8 | 11 |
| V_14 | 14 |

External Controller 16

An external controller according to embodiments of the present invention can use response functions to steer a system such that common constraints and common objectives can be met.

The aim of the external controller can be for example to minimize the use of a fossil fuel e.g. oil based installation and provide as much heat as possible with a renewable energy such as a pellet based installation. In this experiment, the heat demand is increased by 70% in order to provoke a situation where the pellet installation alone cannot provide all needed heat.

Features used here are the manipulated temperatures in the past, the current and future manipulated temperatures, the past heat consumption of the building, the forecasted outside temperature, the hour in the day, and the day in the week and the day in the year.

$$g(Q) = Q\lambda^{pellet} + \max(Q - Q_{max}^{pellet}, 0)(\lambda^{oil} - \lambda^{pellet}) + \alpha\Sigma(u_Q - T_{outside})^2 \quad (16)$$

$$\min_{(Q)} g(Q) \quad (17)$$

Subject to $$[F_Q, u_Q] = f_Q \quad (18)$$

$$f_Q \theta_Q = Q \quad (19)$$

$$\underline{Q} \leq Q \leq \overline{Q} \quad (20)$$

$$\underline{u}_Q \leq u_Q \leq \overline{u}_Q \quad (21)$$

With $$g(Q) = Q\lambda^{pellet} + \max(Q - Q_{max}^{pellet}, 0)(\lambda^{oil} - \lambda^{pellet}) + \alpha\Sigma(u_Q - T_{outside})^2 \quad (22)$$

Being the objective function, which is minimized in equation $$\min_{(Q)} g(Q) \quad (23)$$

The last term in $$g(Q) = Q\lambda^{pellet} + \max(Q - Q_{max}^{pellet}, 0)(\lambda^{oil} - \lambda^{pellet}) + \alpha\Sigma(u_Q - T_{outside})^2 \quad (24)$$

is a penalty term, which keeps the manipulated temperature close to the real outside temperature in case this does not lower the costs. α is a small number and $T_{outside}$ the outside temperature.

This minimization is subject to the following constraints:

$$[F_Q, u_Q] = f_Q \quad (18)$$

features of the response function;
  $F_Q$ uncontrolled features
  $u_Q$ controlled features (outside temperature)
  $f_Q$ all features $$f_Q \theta_Q = Q \quad (19)$$

linear response model
  $\theta_Q$ parameters of the linear response model
  Q future heat consumption $$\underline{Q} \leq Q \leq \overline{Q} \quad (20)$$

limits on the heat consumption
  $\underline{Q}$ lower bound on heat consumption
  $\overline{Q}$ upper bound on the heat consumption $$\underline{u}_Q \leq u_Q \leq \overline{u}_Q \quad (21)$$

limits on the manipulated temperature
  $\underline{u}_Q$ lower bound on the manipulated temperature
  $\overline{u}_Q$ bound on the manipulated temperature In this experiment the buildings reacted well and consumed less energy than predicted during moments when consumption peaked. Control was affected by the manipulated temperatures being below the true external temperature some time before the peak consumption. This caused an increase in the heat consumption beforehand which was covered by the pellet (e.g. renewable energy source) installation resulting in temperature increasing in anticipation of the peak load. This allowed the building to consume less energy during the peak load which, without the present invention, would have been above the capacity of the pellet (e.g. renewable energy source) installation. By using the pellet (e.g. renewable energy source) installation more intensively on the run up to full peak load, the actual consumption during peak load was reduced. So the external controller is able to use the dynamics of the system and anticipate beforehand.

The heat consumption of the cluster, including controllable and uncontrollable buildings was improved. The operation of the retrofitted external controller resulted in the heat only being provided by the pellet (e.g. renewable energy source) installation, and the consumption of the oil-based installation was significantly lower than in the uncontrolled situation. So the external controller is able to use the dynamics of the system with the heat consumption being slightly above the maximum capacity, but the external controller is able to provide the heat by the pellet (e.g. renewable energy source) installation only.

If a peak in consumption is approaching, the external controller increases the heat consumption by delivering lower external temperatures to the internal controllers. The controllable buildings receive manipulated temperature which is below the true temperatures in the hours before the peak. Not all the buildings reacted in the same way, some buildings had quicker dynamics while other buildings only started to react in the last hour. The external controller was also able to lower the operational costs of the system.

Online Learning

In embodiments of the present invention the model parameters can be trained on a batch. Depending on the selection of the data for training, the values of the model parameters can change significantly. This means that the parameter values are not constant in time. For example, it may be possible that some parameters have different values during sunny days compared to rainy days or that winter parameters are different from summer parameters etc.

Embodiments of the present invention deal with how the model will evolve. To improve on constant parameters, a filter or filters can be used. One robust manner to take slow parameter variations into account is by means of a Kalman filter. Many other filters are available in literature, like particle filters, ensemble Kalman filters, extended Kalman filters, etc.

For use with a standard Kalman filter it is assumed that the model is linear in the parameters (which is correct) and The disturbances are normally distributed, which is not correct. Hot water demand causes large peaks in the heat demand.

The data were divided in a training set, a validation set and a test set. For this experiment, the test set is used.

For some buildings in the experiment the forecast errors have decreased significantly when a Kalman filter is used. Even with hot water consumption peaks which were almost impossible to forecast the Kalman filter provided an improvement.

Forecast errors averaged out over the complete experiment improve generally on the average with 20 to 50%. Certain choices of manipulated temperature may be more informative and more helpful to estimate/update the model parameters. Maximizing the trace of the Fisher information matrix results in maximizing the square of the manipulated temperatures, when the building is only heated on pellets.

An embodiment of the present invention of an external retrofit controller can be implemented by a digital device with processing capability including one or more microprocessors, processors, microcontrollers, or central processing units (CPU) and/or a Graphics Processing Units (GPU) adapted to carry out the respective functions programmed with software, i.e. one or more computer programs. The software can be compiled to run on any of the microprocessors, processors, microcontrollers, or central processing units (CPU) and/or a Graphics Processing Units (GPU).

Such a device (e.g. the retrofit controller 16) may be a standalone device or may be embedded in another electronic component. The device (e.g. the retrofit controller 16) may have memory (such as non-transitory computer readable medium, RAM and/or ROM), an operating system, optionally a display such as a fixed format display such as an OLED display, data entry devices such as a keyboard, a pointer device such as a "mouse", serial or parallel ports to communicate with other devices, network cards and connections to connect to a network.

The software can be embodied in a computer program product adapted to carry out the following functions for control of a system e.g. by retrofit external controller 16, when the software is loaded onto the respective device or devices e.g. the controller 16 or any other device such as a network device of which a server is one example and executed on one or more processing engines such as microprocessors, ASIC's, FPGA's etc. Methods according to embodiments of the present invention can be applied to a system having one or more thermal energy storage vessels and an electrical distribution system for supplying electrical power to the thermal energy storage vessels.

The software can be embodied in a computer program product adapted to carry out the following functions for such temperature and energy control systems or methods, when the software is loaded onto the respective device or devices e.g. the controller 16, or other device, and executed on one or more processing engines such as microprocessors, ASIC's, FPGA's etc.:

Manipulating at least one parameter accessible to an external retrofit controller, supplying the manipulated parameter to an internal controller of at least one device to be controlled to alter the behaviour of the at least one device to meet at least in part constraints and target objectives of an electricity distribution grid.

The software can be embodied in a computer program product adapted to carry out the following functions for such temperature and energy control systems or methods, when the software is loaded onto the respective device or devices e.g. the controller 16, or other device, and executed on one or more processing engines such as microprocessors, ASIC's, FPGA's etc.:

learning responses of the at least one device to the manipulated parameter, filtering to track drift of the at least one parameter.

The software can be embodied in a computer program product adapted to carry out the following functions for such temperature and energy control systems or methods, when the software is loaded onto the respective device or devices e.g. the controller 16, or other device, and executed on one or more processing engines such as microprocessors, ASIC's, FPGA's etc.:

That the retrofit external controller:

does not alter security based set-points, does not override security cut-outs or fuses or suppress alarms, does not override thermostats of the at least one device, or does not override local security features, That the retrofit external controller has access to at least one parameter a selected from outside temperature, availability of electricity, a temperature and or flow rate in heating or cooling networks, voltage, frequency, currents, in electric distribution networks.

Any of the software mentioned above may be stored on a non-transitory signal storage means such as an optical disk (CD-ROM, DVD-ROM), magnetic tape, solid state memory such as a flash drive, magnetic disk such as a computer hard drive or similar.

Inputs to the External Controller from a DSO

In further embodiments of the present invention a DSO platform is described as well as a method of integrating load flow calculations. A particular mathematical implementation of the Planner and Tracker (mentioned previously) are disclosed. A Dynamic Coalition Manager (DCM) platform is also disclosed, whereby both the DCM and DSO platform are coupled through files with integrated software modules which are operational and able to reduce curtailment. In particular embodiments of the present invention provide a reduction in curtailment with an increase in flexibility and there can be a corresponding increase in the production of energy.

Embodiments of the present invention described above include grid constraints and target objectives of a grid being stored in a memory of the external (retrofit) controller. Further embodiments of the present invention can provide an external controller that reacts to dynamic alterations in the grid constraints and target objectives. For example, embodiments of the present invention can make use of the Dynamic Coalition Manager (DCM) platform which contains optimization algorithms for local distribution grid level RES curtailment mitigation in a grid secure manner, system RES curtailment mitigation (=excess RES absorption maximization) using distribution grid connected flexibility within the local grid constraints, and balancing services using distribution grid connected flexibility within the local grid constraints. These algorithms can be integrated in a NODA cloud platform solution, and extended with a standards-based interface towards the DSO, the BRP and the building agents.

Embodiments of the present invention include implementation of algorithms in the DCM Planner and Tracker agents that are needed for UC1 (local RES curtailment mitigation) as well as other use cases. An objective involves a day-ahead and/or intra-day optimization algorithm for the DCM platform that limits the curtailment of local RES by means of Power-to-Heat flex activations of local buildings. The grid optimizations make use of the external retrofit controller described above to alter local operation to the benefit of the grid as a whole.

For example, the DCM can control the flexibility of a set of buildings, based on following information:
- the day-ahead forecast of the building RES generation (if any),
- the day-ahead forecast of building base load profiles (sum of controllable P2H loads and non-controllable loads),
- the day-ahead forecast of building flex capabilities with associated cost, and
- The mapping of the building to the grid zone to which it belongs.

Based on the received information, the algorithms will calculate for each of the buildings a day-ahead or intraday requested load profile. This load profile can be communicated to the external retrofit controller described above.

To determine whether flex activations will be needed to avoid local curtailment because otherwise grid constraints would be violated, and to ensure that flex activations themselves will not cause local grid constraint violation, load flow calculations are performed by the DSO. The DSO will calculate a flex request, and interacts with the DCM to request activation of the flexibility offered by the buildings to limit the curtailment of distributed renewable energy resources.

The DSO calculates the flex request based on following information:
- RES forecasts (of assets not associated with buildings)
- Non-controllable Building load forecasts (these may be negative if the building contains RES)
- Controllable Building load forecasts (baseline+Flexibility): these are provided by the DCM
- Weather forecasts (to aid in RES or non-controllable building load forecasting)
- Local grid model: a local grid model will be used to analyze congestion problems in the grid due to renewable energy production.

The flex request calculation results in either a flex band (limits for the allowed flex activations) or in a flex activation profile. In the latter case, the DSO will determine the optimal flex activation plan from his perspective based on information of the available flexibility and cost.

The DCM platform will play the role of
- interfacing with the DSO,
- aggregating baseline and flexibility forecasts from buildings;
- disaggregating and dispatching the flexibility activation; and
- transmitting updated grid constraints and/or target objectives to the external (retrofit) controller 16 mentioned above, i.e. to provide dynamic grid constraints and/or target objectives, as well as receiving updated energy consumptions from external (retrofit) controller 16.

Grid Zone Clustering

Embodiments of the present invention provide an optimization framework that solves the optimal flexibility dispatch problem for the DSO. The framework determines the quantity and price of the flexibility that the DSO needs to procure.

The main goal is to enable the DSO to coordinate the consumption pattern of consumers in a planned pro-active manner on the day-ahead and/or intra-day basis. The DSO's success in determining the correct amount of flexibility needed to utilize per time unit is strongly affected by the accuracy of load and DERs production forecasts. The problem is that such forecasts are difficult to be carried out at the desired accuracy as the load profile for every household differs drastically from the other and follows almost no specific pattern. Therefore, forecasting the load profile of buildings in day-ahead horizon can be error. Under such circumstances, the DSO needs to find an alternative flexibility resource to compensate for the deviations.

One solution to the above mentioned problem is to reduce the distribution grid under study to a number of grid zones. The main reasons are
  (i) The violation of operation limits in the network is mostly happen at specific points in the grid (so-called weak network points). Thus, once the weak points are identified, one can aggregate every group of buildings that are incident free (buses and the households that are connected to them) into one clusters and reduce the size of the problem to a number of incident free (i.e., copper plate) grid zone clusters that are connected to weak point spots where violation of the operational limits are most likely to take place.
  (ii) In contrast to profile of an individual building, it is possible to forecast the aggregated profile of several households at higher accuracy.
  (iii) As every grid zone cluster is considered as a copper plate that includes a number of flexible building units, if one unit cannot stick to the schedule plan, there is still a room for the other units within the cluster to adopt a new change to compensate for the building units falling short from their responsibilities, such that the total flexibility the cluster delivers to the DSO remains the same. This creates opportunity for units to maximize their utilization of the DR program and at the same time, simplifies the problem for the DSO as in so many cases deviations are being accounted for without direct intervention of the DSO.
  (iv) In many cases grid parameters are not always known or not available at the required precision. If large parts of the grid are reduced into one grid zone cluster, the exact value of the grid parameters for the parts that fall within the cluster are not required.

For all these reasons, the buildings can be grouped into several grid zones, and these grid zone clusters can be controlled instead of individual buildings. Hence the external retrofit controller 16 in any of the embodiments of the present invention can be adapted to control a cluster of buildings and not just one building. In practice and to solve this issue, an a priori LFC can be performed. Those parts of the grid where no problems ever occur are clustered. As a definition, 90% of the maximum capacity can be used. If this threshold is never passed in a region of the grid, this region is clustered as a grid zone cluster.

Flexibility Estimation

Optimal Flexibility Dispatch Calculations

The Optimal Power Flow problem (OPF) and its derivatives such as optimal flexibility dispatch involves considering the physics of power flows, generation units and consumer devices and are multi-period and security constrained.

Due to the application of flexibility, the solver is expected to deliver a solution within a reasonable time. These types of problems can include switching actions, grid configurations and other features that would make it necessary to introduce mixed-integer variables in the formulation of the problem. Recently, the emergence of energy storage devices has led to the introduction of complementarity conditions. All these aspects show that power flow related problems are generally non-convex, nonlinear, complex-valued problems that are difficult to solve.

For these problems, one has to balance and compromise between simulation time and accuracy of the solution. That is, one has to decide between solving a non-convex problem quickly but to a local optimality or slowly to global optimality. To make such problems tractable, mathematical approaches are proposed to simplify the problem. Linear approximations and convex-relaxation of optimal power problems are two approaches that are used in literature to make the power flow related problem convex to improve computational efficiency at the expense of introducing a slight compromise in accuracy in the final solution. In embodiments of the present invention a second-order cone relaxed formation of the AC power flow formulation is used to make the optimal flexibility dispatch problem convex.

Formulation of the Optimal Flexibility Dispatch Problem

A distribution network is considered with $n(\Omega_N)$ bus where N is a set of all buses. Index n is used to refer to buses. Index $l \in \Omega_{L_n}$ is used to refer to branches.

$\Omega_{L_n} = \Omega_{L_n}{}^{fr} \cup \Omega_{L_n}{}^{to}$ is the set of all branches that are connected to bus n where $\Omega_{L_n}{}^{fr}$ and $\Omega_{L_n}{}^{to}$ present the set of branches that are connected at the "sending end" and "receiving end", respectively. Index $t \in \Omega_t$ is used to refer to every instance in time. t is the set of all operating instances. We define $\Omega_{G_n}$ and $\Omega_{D_n}$ respectively to present the set of generators and loads of bus n. Finally, $\Omega_{G_n}{}^{DERs}$ denotes the set of Distributed Energy Resources (DERs) in node n. It is assumed that the complete distribution grid is reduced to several clusters. Each cluster comprises of flexible and non-flexible supply and demand units. Every cluster is considered as a copper plate that is operated by a centralized aggregator that controls the controllable supply and demand devices of every household within the cluster. The aggregator collects the base energy profile and the flexibility offers from household agents, aggregates them and provides the aggregated based active and reactive supply ($P_{g,n,t}{}^0$, $Q_{g,n,t}{}^0$) and demand profiles ($P_{d,n,t}{}^0$, $Q_{d,n,t}{}^0$). The aggregator also provides the upper and lower bound of active and reactive flexibility ($\Delta P_{r,n,t}{}^{Min}$, $\Delta P_{r,n,t}{}^{Max}$, $\Delta Q_{r,n,t}{}^{Min}$, $\Delta Q_{r,n,t}{}^{Max}$), that every controllable supply {$r=g|g \in \Omega_{G_n}$, $n \in \Omega_n$} or demand ({$r=d|d \in \Omega_{D_n}$, $n \in \Omega_n$} device in the cluster $n \in \Omega_n$ offers to the DSO at every $t \in \Omega_t$. Based on the provided information, the DSO determines the flexibility amount that it requires from every controllable device ($\Delta P_{r,n,t}$ and $\Delta Q_{r,n,t}$, $r \in [g, d]$) to solve a specific operational problem.

We consider nodal voltage, the active and reactive power that is provided by every generating unit or every flexible load of every node at every operating time instance as the set of optimization variables. Subsequently, we define active and reactive power flow over every branch is dependent optimization variables.

In what follows, two alternative formulations of the optimal flexibility dispatch problem are presented.

Full AC Formulation of OFD

For every bus, we define real flexibility of every flexible generator ($\Delta P_{g,n,t}$) and flexible load ($\Delta P_{d,n,t}$), reactive flexibility of every generator ($\Delta Q_{g,n,t}$) and load ($\Delta Q_{d,n,t}$) as well as the complex voltage as decision variables ($v_{n,t}$). The full-AC based OFD problem takes the following form:

$$\min \Omega \quad (22)$$

$$(v_{n,t}, \Delta P_{g,n,t}, \Delta Q_{g,n,t}, \Delta P_{d,n,t}, \Delta Q_{d,n,t})$$

Subject to, $$\underline{Lv_{n,t}} \leq Lv_{n,t} \leq \overline{Lv_{n,t}} \quad n \in \Omega_N, t \in \Omega_t \quad (13)$$

$$\underline{|v_{n,t}|} \leq |v_{n,t}| \leq \overline{|v_{n,t}|} \quad n \in \Omega_N, t \in \Omega_t \quad (24)$$

$$P_{r,n,t} = P_{r,n,t}^0 + \Delta P_{r,n,t} \quad r \in [g, d], g \in \Omega_{G_n}, d \in \Omega_{D_n}, \quad (25)$$
$$n \in \Omega_n, t \in \Omega_t$$

$$Q_{r,n,t} = Q_{r,n,t}^0 + \Delta Q_{r,n,t} \quad r \in [g, d], g \in \Omega_{G_n}, d \in \Omega_{D_n}, \quad (26)$$
$$n \in \Omega_n, t \in \Omega_t$$

$$\underline{\Delta P_{r,n,t}} \leq \Delta P_{r,n,t} \leq \overline{\Delta P_{r,n,t}} \quad r \in [g, d], g \in \Omega_{G_n}, d \in \Omega_{D_n}, \quad (27)$$
$$n \in \Omega_n, t \in \Omega_t$$

$$\underline{P_{r,n,t}} \leq P_{r,n,t} \leq \overline{P_{r,n,t}} \quad r \in [g, d], g \in \Omega_{G_n}, d \in \Omega_{D_n}, \quad (28)$$
$$n \in \Omega_n, t \in \Omega_t$$

$$\underline{\Delta Q_{r,n,t}} \leq \Delta Q_{r,n,t} \leq \overline{\Delta Q_{r,n,t}} \quad r \in [g, d], g \in \Omega_{G_n}, d \in \Omega_{D_n}, \quad (29)$$
$$n \in \Omega_n, t \in \Omega_t$$

$$\underline{P_{r,n,t}} \leq P_{r,n,t} \leq \overline{P_{r,n,t}} \quad r \in [g, d], g \in \Omega_{G_n}, d \in \Omega_{D_n}, \quad (30)$$
$$n \in \Omega_n, t \in \Omega_t$$

$$\underline{F_{l,t}^p} \leq F_{l,t}^{p,k} \leq \overline{F_{l,t}^p} \quad k \in [fr, to], l \in \Omega_{L_n}^k, n \in \Omega_N, t \in \Omega_t \quad (31)$$

$$\underline{F_{l,t}^q} \leq F_{l,t}^{q,k} \leq \overline{F_{l,t}^q} \quad k \in [fr, to], l \in \Omega_{L_n}^k, n \in \Omega_N, t \in \Omega_t \quad (32)$$

$$\sum_{l \in \Omega_{L_n}^{fr}} F_{l,t}^{p,fr} - \sum_{l \in \Omega_{L_n}^{to}} F_{l,t}^{p,to} = \sum_{g \in \Omega_{G_n}} P_{g,n,t} - \quad n \in \Omega_N, t \in \Omega_t \quad (33)$$

$$\sum_{d \in \Omega_{D_n}} P_{d,n,t}$$

$$\sum_{l \in \Omega_{L_n}^{fr}} F_{l,t}^{q,fr} - \sum_{l \in \Omega_{L_n}^{to}} F_{l,t}^{q,to} = \sum_{g \in \Omega_{G_n}} Q_{g,n,t} - \quad n \in \Omega_N, t \in \Omega_t \quad (34)$$

$$\sum_{d \in \Omega_{D_n}} Q_{d,n,t} - b_n^s \cdot |v_{n,t}^i|^2$$

(Note that other elements could also be included in the objective function given in (22) (such as operation costs and/or cost of loss of load). The output of the model includes, flexibility amounts, the new operating set-points of all flexible units (i.e., controllable supply and demand devices), power flow over all lines and bus voltages.)

Considering:

$$\Omega = \sum_{t \in \Omega_t} \sum_{\substack{g \in \Omega_{G_N^f} \\ n \in \Omega_N}} [\overline{P}_{g,n,t} - P_{g,n,t}], \quad (35)$$

$$F_{l,t}^{p,fr} = (g_{sh}^n + g_s^l)/t_m^l \cdot |v_{n,t}^{fr}|^2 - \quad l \in \Omega_{L_n}, n \in \Omega_N^{fr},$$
$$(g_s^l \cdot t_r^l - b_s^l \cdot t_i^l)/t_m^l \cdot |v_{n,t}^{\cos(fr-to)}| - \quad t \in \Omega_t$$
$$(b_s^l \cdot t_r^l - g_s^l \cdot t_i^l)/t_m^l \cdot |v_{n,t}^{\sin(fr-to)}|$$

-continued $$F_{l,t}^{q,fr} = -(b_{sh}^n + b_s^l)/t_m^l \cdot |v_{n,t}^{fr}|^2 - \quad l \in \Omega_{L_n}, n \in \Omega_N^{fr}, \quad (36)$$
$$(b_s^l \cdot t_r^l - g_s^l \cdot t_i^l)/t_m^l \cdot |v_{n,t}^{cos(fr-to)}| - \quad t \in \Omega_t$$
$$(g_s^l \cdot t_r^l - b_s^l \cdot t_i^l)/t_m^l \cdot |v_{n,t}^{sin(fr-to)}|$$

$$F_{l,t}^{p,to} = (g_{sh}^n + g_s^l) \cdot |v_{n,t}^{to}|^2 - \quad l \in \Omega_{L_n}, n \in \Omega_N^{to}, \quad (37)$$
$$(g_s^l \cdot t_r^l - b_s^l \cdot t_i^l)/t_m^l \cdot |v_{n,t}^{cos(fr-to)}| - \quad t \in \Omega_t$$
$$(b_s^l \cdot t_r^l - g_s^l \cdot t_i^l)/t_m^l \cdot |v_{n,t}^{sin(fr-to)}|$$

$$F_{l,t}^{q,to} = -(b_{sh}^n + b_s^l) \cdot |v_{n,t}^{to}|^2 - \quad l \in \Omega_{L_n}, n \in \Omega_N^{to}, \quad (38)$$
$$(b_s^l \cdot t_r^l - g_s^l \cdot t_i^l)/t_m^l \cdot |v_{n,t}^{cos(fr-to)}| - \quad t \in \Omega_t$$
$$(g_s^l \cdot t_r^l - b_s^l \cdot t_i^l)/t_m^l \cdot |v_{n,t}^{sin(fr-to)}|$$

where $$|v_{n,t}^{cos(fr-to)}| = |v_{n,t}^{fr}| \cdot |v_{n,t}^{to}| \cdot \cos(\angle v_{n,t}^{fr} - \angle v_{n,t}^{to})$$

$$|v_{n,t}^{sin(fr-to)}| = |v_{n,t}^{fr}| \cdot |v_{n,t}^{to}| \cdot \sin(\angle v_{n,t}^{fr} - \angle v_{n,t}^{to})$$

Note that $$t_r^l = |T^l| \times \cos(\theta^l)$$

$$t_i^l = |T^l| \times \sin(\theta^l)$$

$$t_m^l = |T^l|^2$$

$T^l$ is the tap ratio and $\theta^l$ is the angle shift of the transfer as are discussed in (Coffrin, 2015) (C. Coffrin, 2016).

The objective function (equation 22) seeks to minimize the aggregated curtailment of DERs in all clusters overall operating hours. Constraints (23) and (24) define the voltage angle and magnitude of the bus that connects every cluster to the distribution grid. Equations (25) and (26) define the active and reactive power production or consumption of controllable devices at every cluster, as the sum of base load and the activated flexibility. Constraints (27)-(28) are the lower and upper boundaries over active flexibility and power of every controllable unit of every cluster, respectively. Constraints (29)-(30) impose analogous limits for reactive flexibility and power. Equations (31)-(34) express the Kirchhoff's Voltage Laws for the branches. Constraints (35) and (36) correspond to active and reactive power flow constraints on both directions of each branch. Finally, real and reactive power balance are enforces in constraints (37) and (38). The optimization problem (22)-(38) is modelled in ofd.jl and is coded in Julia language and implemented in ATOM. This is in general a nonlinear and non-convex optimization problem. Therefore, formulation of the problem as shown above is less good especially for large-scale multi-period problems due to computational intensity. Nevertheless, these functions can be defined (even if one cannot derive them in closed form), as if solved, it would return the exact solution to the problem as is shown in the next section. One way to make problems defined in equations (22)-(38) tractable, is to use a convex-relaxed formulation of AC power flow as discussed in (Low S., 2014), (L. Gan, 2015) and derived in the next sub-section.

Second-Order Cone-Relaxed Formulation of OFD

There are two main convex-relaxed formulation of optimal power flow (OPF) problem: the bus injected model (BIM) and the branch flow model (BFM). The two formulations are shown equivalent under certain assumptions (D'hulst F. G., 2017). In what follows we present the SOC relaxed formulation of the OFD problem.

Analogous to the previous case, we associated with each bus squared voltage magnitude ($u_{n,t}$), active flexibility of every flexible generator ($\Delta P_{g,n,t}$) and flexible load ($\Delta P_{d,n,t}$) as well as the reactive flexibility of every flexible generator ($\Delta Q_{g,n,t}$) and flexible load ($\Delta Q_{d,n,t}$) as decision variables.

The second-order cone formulation of the optimal flexibility dispatch problem is inspired by the work presented in (Papavasiliou, 2017) and takes on the following form:

$$\min \Omega$$
$$(u_{n,t}, u_{m,n,t}^r, u_{m,n,t}^i, \Delta P_{g,n,t}, \Delta Q_{g,n,t}, \Delta P_{d,n,t}, \Delta Q_{d,n,t})$$

Subject to, $$\underline{u_{n,t}} \le u_{n,t} \le \overline{u_{n,t}} \quad m,n \in \Omega_N, t \in \Omega_t, \quad (39)$$

$$\underline{u_{m,n,t}^r} \le u_{m,n,t}^r \le \overline{u_{m,n,t}^r} \quad m,n \in \Omega_N, t \in \Omega_t, \quad (40)$$

$$\underline{u_{m,n,t}^i} \le u_{m,n,t}^i \le \overline{u_{m,n,t}^i} \quad m,n \in \Omega_N, t \in \Omega_t \quad (41)$$

$$(u_{m,n,t}^i)^2 + (u_{m,n,t}^r)^2 \le u_{m,t} \cdot u_{n,t} \quad m,n \in \Omega_N, t \in \Omega_t \quad (42)$$

$$(3-12) \quad (43)$$

Where $$F_{l,t}^{p,fr} = (g_{sh}^n + g_s^l)/t_m^l \cdot u_{n,t}^{fr} - (g_s^l \cdot t_r^l - b_s^l \cdot t_i^l)/t_m^l \cdot u_{n,t}^r - (b_s^l \cdot t_r^l - g_s^l \cdot t_i^l)/t_m^l \cdot u_{n,t}^i \quad l \in \Omega_{L_n}, n \in \Omega_N^{fr}, t \in \Omega_t \quad (44)$$

$$F_{l,t}^{q,fr} = (b_{sh}^n + b_s^l)/t_m^l \cdot u_{n,t}^{fr} - (b_s^l \cdot t_r^l - g_s^l \cdot t_i^l)/t_m^l \cdot u_{n,t}^r - (b_s^l \cdot t_r^l - g_s^l \cdot t_i^l)/t_m^l \cdot u_{n,t}^i \quad l \in \Omega_{L_n}, n \in \Omega_N^{fr}, t \in \Omega_t \quad (45)$$

$$F_{l,t}^{p,to} = (g_{sh}^n + g_s^l) \cdot u_{n,t}^{to} - (g_s^l \cdot t_r^l - b_s^l \cdot t_i^l)/t_m^l \cdot u_{n,t}^r - (b_s^l \cdot t_r^l - g_s^l \cdot t_i^l)/t_m^l \cdot u_{n,t}^i \quad l \in \Omega_{L_n}, n \in \Omega_N^{to}, t \in \Omega_t \quad (46)$$

$$F_{l,t}^{q,to} = (b_{sh}^n + b_s^l) \cdot u_{n,t}^{to} - (b_s^l \cdot t_r^l - g_s^l \cdot t_i^l)/t_m^l \cdot u_{n,t}^r - (g_s^l \cdot t_r^l - b_s^l \cdot t_i^l)/t_m^l \cdot u_{n,t}^i \quad l \in \Omega_{L_n}, n \in \Omega_N^{to}, t \in \Omega_t \quad (47)$$

Note that in the SOCP formulation of the OFD problem, complex voltage variables are replaced by cross-products of bus voltages $u_{n,t} = (v_{n,t})^2$ [22]. Equations (40)-(42) define respectively the lower and upper bounds of the squared voltage magnitude and bus-paired voltage products.

Note that $\underline{u_{m,n,t}^r}$, $\overline{u_{m,n,t}^r}$, $\underline{u_{m,n,t}^i}$, $\overline{u_{m,n,t}^i}$ are defined in [23]. Constraint (43) is the rotated second-order cone relaxation of the original formulation of power flow problem and is effective for existing connections mn as discussed in [22]. Note that equation (43) is where relaxation in accuracy can occur. The solution of the problem would have a physical interpenetration only if the SOCP relaxation is exact, meaning that equation (43) satisfies as an equality constraint. Constraint (44)-(47) are identical to (25) to (38) with the difference that power flows in (40)-(43) are defined as a function of squared voltage magnitudes and bus-paired voltage products.

Design of DCM Components

Figure 5:
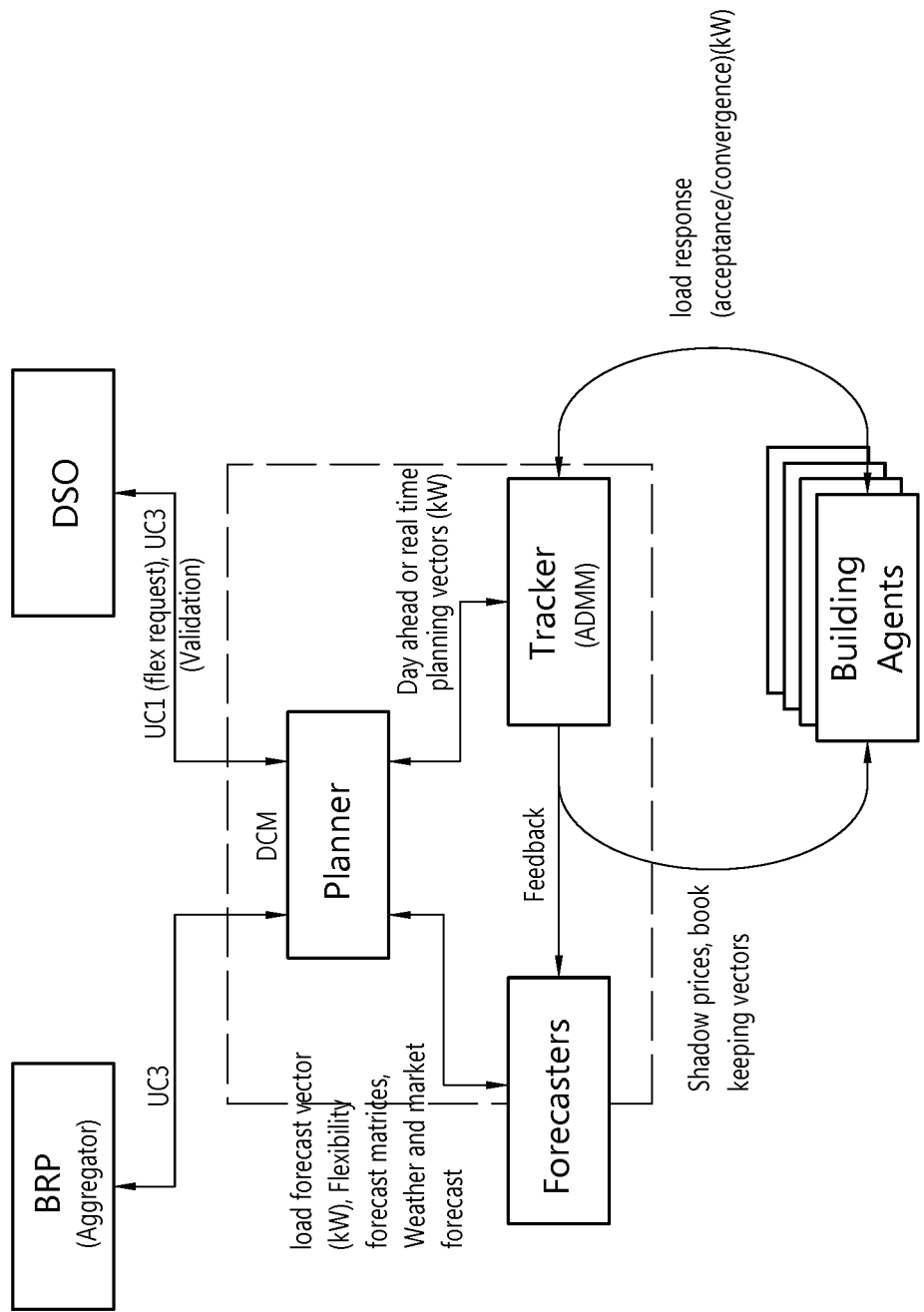
FIG. 5: DCM platform design according to a further embodiment of the present invention.
Figure 6:
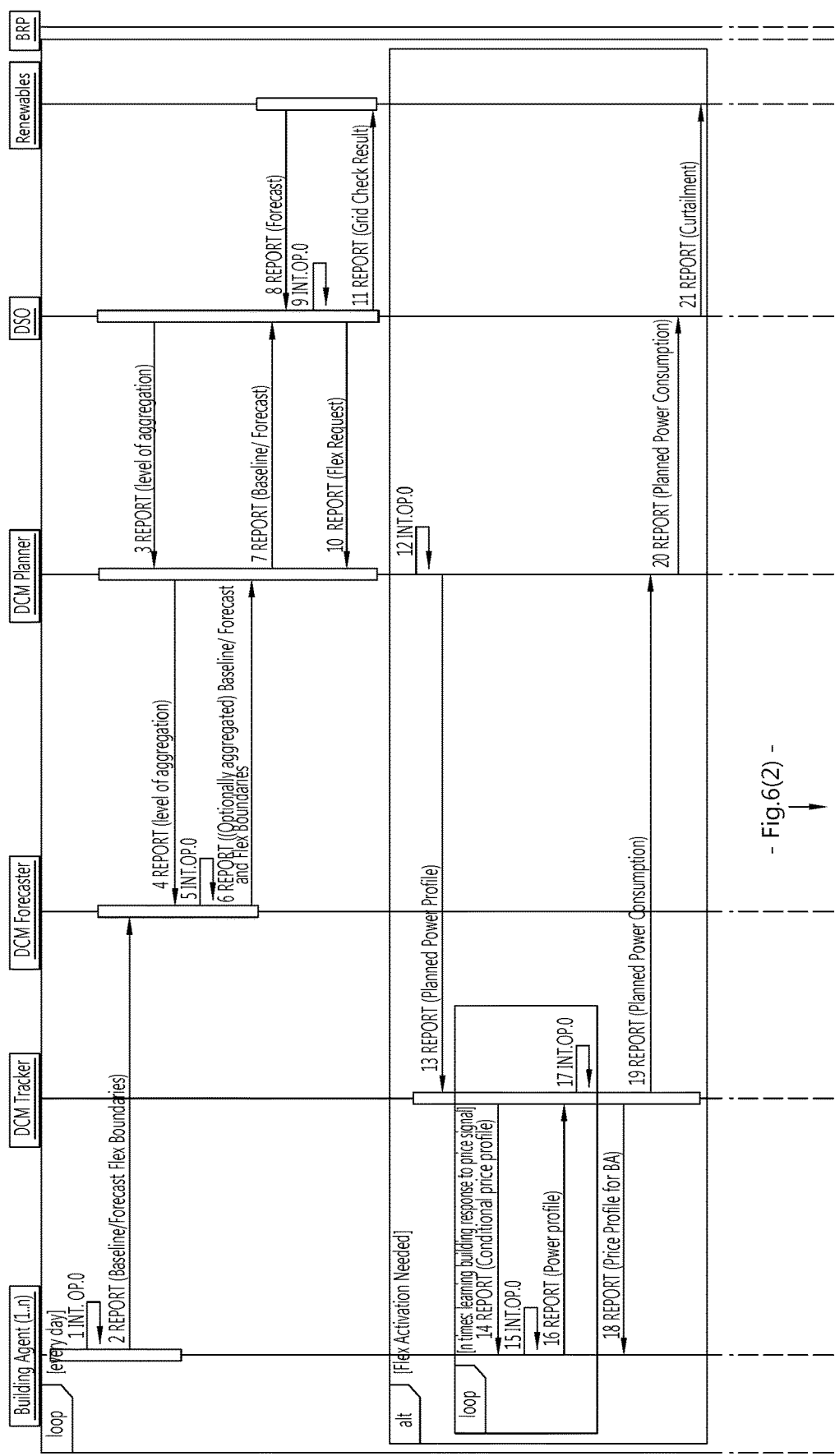
FIG. 6: UML interaction scheme for UC1 according to a further embodiment of the present invention.
Figure 6:
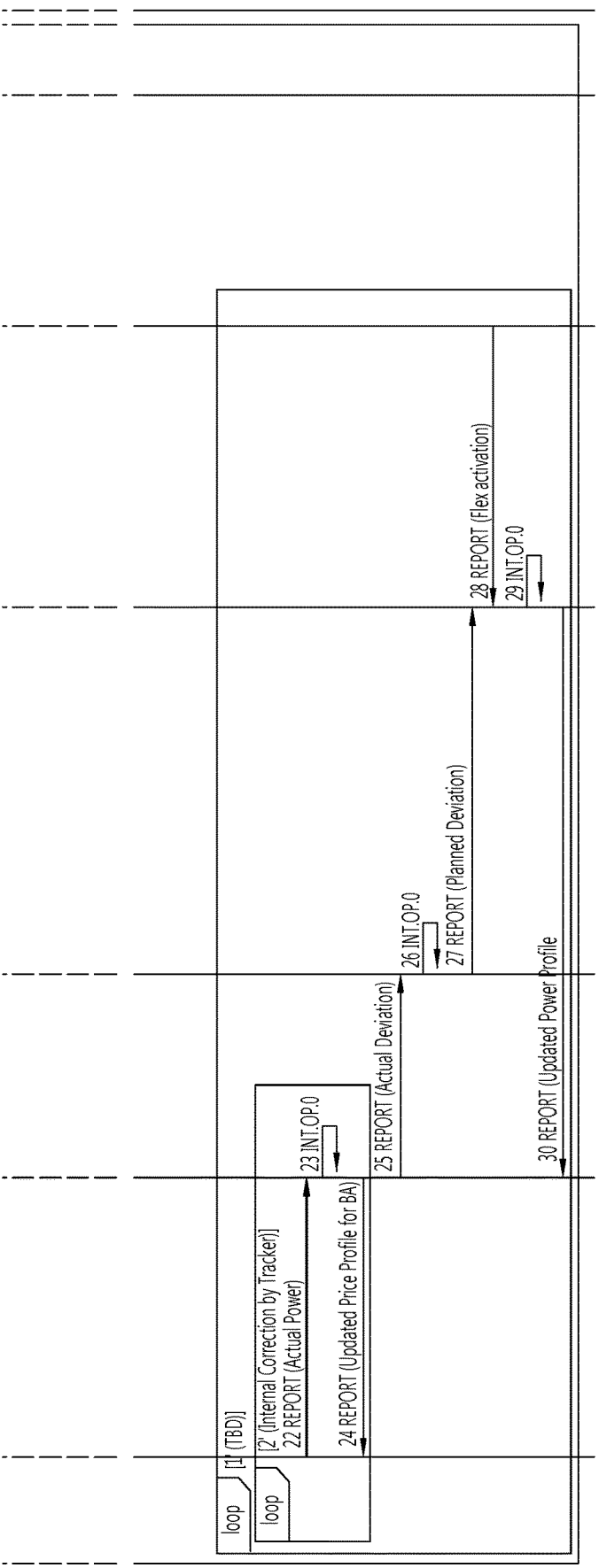

FIG. 5 shows the basic structure of the DCM in accordance with embodiments of the present invention. The main components of the DCM are the Planner, Tracker and the Forecaster. The DCM can provide updated GRID constraints and/or grid target objectives to an external (retrofit) controller 16, e.g. via the DSO.

The DCM(s) will call the Planner first and then Tracker instances for the different clusters or grid zones.

Each of the components is described in more detail in the following subsections.

Planner

The Planner gives an advance plan (typically day ahead) for the clusters (or buildings) that are part of the DCM's control region. This plan contains the overall energy consumption of the cluster or clusters. The Planner does not need to plan for individual buildings. The planner has certain objectives depending on the use-case. Based on the forecasts of aggregated flexibility and base load forecasts of the cluster, and the use-case constraints and objective, the Planner solves an optimization problem to come up with the (day ahead) plan.

In order to come up with this plan, and in line with the interactions put in place for the use-case (FIG. 6), the Planner is foreseen to have the following interactions:

The Planner must be able to communicate with a DSO, BRP, Forecaster and Tracker.

The Planner must be able to change its functionality, depending on the UC.

For each UC, the Planner must construct a consumption profile for each cluster to the Tracker. This profile includes background consumption and overall flex activation.

More adaptions may be needed if intraday or real-time flex activation is implemented. Should there be any interdependencies between clusters; the Planner is foreseen to manage them.

Planner Setup for UC1

The Planner has the following functionality for UC1 (use case 1) Initialization:

Get the clustering information from the DSO.

The Planner reports this clustering to the Forecaster.

Operations:

After the Forecaster reports the forecast and flexibility to the Planner, the Planner reports this forecast to the DSO.

If a flexibility activation request is reported to the Planner, it constructs a plan for each cluster, taking into account the flex request (upper and lower bound for power for each cluster) from the DSO.

TABLE 1

Symbol list
Notation

| | |
|---|---|
| Day ahead price electricity (Euro/kWh) | $\lambda_E$ |
| Forecast baseline load (kW) | $P_{bl}$ |
| Available flexibility (matrix vector inequality), cost matrix (units to be defined in the Forecaster) | $A_f, b_f, C_f$ |
| Flex request DSO upper, lower bound (kW) | $P_{dso,u}, P_{dso,l}$ |
| Flex activation (kW) | $\Delta P$ |
| Time step size (hours) | $\Delta t$ |

The Planner minimizes the total cost of energy. This includes the price of electricity for example in a day-ahead market and the most optimal way of activating flexibility (subject to availability and DSO constraints).

Minimization Objective $$a\lambda_E(P_{bl}+\Delta P)\Delta t + C_f \Delta P \quad (48)$$

If the Planner takes the energy position for the entire grid zone in the energy market, $\alpha$ is one; if not $\alpha$ is zero. The above optimization problem is subject to the following constraints:

Flexibility constraint. This ensures that the flexibility activation satisfies the linear inequality constraints that it is bounded by (upper bound, lower bound, ramp rate, total consumption etc.).

$$A_f \Delta P \leq b_f \quad (49)$$

DSO constraint (To ensure that the activation is in line with the request from the DSO)

$$P_{dso,l} \leq P_{bl}+\Delta P \leq P_{dso,u}. \quad (50)$$

Tracker

The tracker works on a group level to take the flex plan from the Planner and dispatch this among all the underlying vDERs. Once the plan is generated from the planner, the tracker receives this and triggers an iterative process with the vDERs. It starts a negotiation with the vDERs by means of a distributed optimization problem called alternating direction method of multipliers (ADMM), see (Boyd, Parikh, Chu, Peleato, & Eckstein, 2010). The optimization problem solved by the Tracker is summarized below.

TABLE 2

Symbol list
Notation

| | |
|---|---|
| Controllable load Plan from the planner | $P_{planner}$ |
| Number of agents/buildings | N |
| Shadow price in the $k^{th}$ iteration | $\lambda^k$ |
| Response of agent i in the $k^{th}$ iteration (kW) | $P_i^k$ |
| Average of all the agents' response in $k^{th}$ iteration (kW) | $\overline{P^k}$ |
| Local agent objective w.r.t to the heat load | $f_i(P_i)$ |

In this approach, the Tracker solves the following optimization problem:

Objective $$\text{minimize} \sum_i f_i(P_i)$$

Subject to $$\sum_i P_i = P_{planner}$$

This is solved using the following update scheme (power profile update in the vDERs and the prices updates in the Tracker):

$$P_i^{k+1} = \arg\min_{P_i}\left(f_i(P_i) + \lambda^k \cdot P_i + \frac{\rho}{2}\left\|P_i - \frac{P_{planner}}{N} - (P_i^k - \overline{P^k})\right\|_2^2\right)$$

$$\lambda^{k+1} = \lambda^k + \rho(\overline{P^{k+1}} - P_{planner})$$

Vectors to be passed from tracker to agent: $P_{planner}$(once), $\lambda^k$, $\overline{p^k}$ The iterations are continued until convergence or till a maximum limit is hit.

Forecaster

Building Agent

Forecasting based on building thermal models. A forecast can be made based on a specified objective (e.g. EE, dynamic pricing, self-consumption, . . . ). The special case where a forecast is made based on dynamic pricing is used with the ADMM.

UML schemes for UC1

This section gives the UML schema and some explanations for UC1. We detail out the process steps, depicted in UML diagram in FIG. 6. Pre-processing steps 1. The building agents forecast their power profile for the coming hours/days and estimate their flexibility. The flexibility is stored as an inequality constraint.
2. The forecasts and flex estimate are reported to the Forecaster.
3. The planner receives the grouping (per grid zone) information from the DSO.
4. The Planner reports this grouping to the Forecaster.
5. The forecaster forecasts the non-controllable loads for each DER
6. The Forecaster aggregates the forecasts of controllable power and flexibility for each group. Optionally, the Forecaster applies uncertainty related information learned from monitoring consumption profiles for each cluster and the correlation between the clusters/buildings.
7. The Forecaster reports the grouped forecasts and flexibility to the Planner.
8. The Planner reports the grouped forecast to the DSO.
9. The Renewable source reports its planned production to the DSO.
10. The DSO forecasts the consumption of non-controllable DER (that do not belong to a DCM)
11. The DSO performs the flexibility dispatch calculation to check if curtailment would be needed and if so, formulates a flex request for the DCM (how much flexibility is needed and allowed where and when so that the problem is solved, and no new problem is created by the activation itself
12. An 'ok' or 'wait' is reported to the renewable source.

Day Ahead and/or Intra-Day Flex Activation Plan Calculation

1. The Planner constructs a plan (forecast) for each group, taking into account the flex request from the DSO.
2. This plan per group is reported to the Tracker.
3. The Tracker reports an energy price profile to all buildings belonging to a group. This price may vary from group to group, depending on the flexibility needed in that group and the value of that flexibility.
4. Every Building Agent calculates its optimal power consumption in in response to the received price profile
5. The building Agent reports its planned power profile to the Tracker.
6. The Tracker compares the overall consumption of each group with the planned consumption and adapts the energy price to bring both in agreement.
7. A definite price profile per group is reported to all buildings.
8. A definite power profile per group is reported to the Planner. (flex offer)
9. The Planner reports the planned Power Consumption to the DSO. (flex offer)
10. The DSO confirms the flex order to the DCM
11. Possibly, the DSO reports a remaining curtailment request to the Renewable source.

Real Time Flex Activation Tracking

1. Every building Agent reports continuously its actual consumption to the Tracker.
2. The Tracker aggregates the consumption for each group and compares it with the planned consumption. Deviation is transformed in price adaptations.
3. An updated price profile is reported to the building agents so that they change their plan in a way that compensates the observed deviation.
4. Any remaining deviation may result in a grid problem that will be observed and addressed by the DSO.
5. The monitored profiles are sent to the forecaster to be used for learning the reliability of forecasts DCM Software The software for the DSO and DCM algorithms has been implemented in Python. The interpreter version being used is 2.7. The software is modularized and there is a one to one correspondence between the various DCM components and the modules. In addition, there is one module to read all the required data from a database, and another module to schedule the different components of the database. The modules are listed below:

planner.py: Implements the functionality of the Planner. The Planner's objective and constraints fit into the framework of a convex optimization problem. To solve this, the cvxpy optimization package is used in the Planner. The Planner takes as input a pandas data frame with all the relevant use case information—baseline forecast, flexibility forecast, DSO flex band. The objective and constraints are then framed into a convex optimization problem setup and the solution is returned again as a data frame.

tracker.py: Implements the functionality of the tracker. It receives as input the output of the Planner and implements the ADMM distributed optimization algorithm. This basically involves aggregation of responses from the building agents, updating of shadow prices and broadcasting of these prices, until the aggregation of the building agents are in line with the Planners output.

building_agent.py: The building agent can be developed in WP2. For the purpose of the first WP3 simulations, we are reusing simplified agents that provide information in the defined formats. This simplified building agent works with a linear model of the building, which is trained based on features such as outdoor temperature, past heat loads etc. The heat load is assumed to directly influence the electricity load as if the building were heated by an electric resistor. The building agent performs the local optimization (also convex) in line with the ADMM methodology.

Controller.py: This module is the interface with the database that contains all information that is needed for testing the developed WP3 algorithms, like weather and price forecast information, model parameters of the buildings, DSO bounds etc.

main.py: It does the orchestration/scheduling of the various modules involved. i.e., first the controller, then the Planner, tracker, then plots results etc.

vito_config_controller.yml: the input file with various configuration parameters. For instance optimization parameters such as alpha for the Planner, the list buildings in the cluster, date ranges for the data to be fetched, the parameter rho for the Tracker, forecast horizon config.py: parses the information contained in vito_config_controller.yml.

Although development and testing of the needed WP3 algorithms is described, and the Planner and the DSO communicate through files in json formats (nested dictionary structures that are understood across programming languages) the present invention is not limited thereto. The Planner produces json files (e.g. one per time step), with the necessary information needed by the grid and the algorithm running on the DSO side processes these json files one by one, to in turn stored the results into corresponding output json files (which the Planner then interpreted). This file-based interaction can be replaced by a multi-agent communication framework as part of the DSO and DCM platform and related agent development.

Simulation Setup and Results

The following section describes the simulation setup and the results for the testing of the developed algorithms.

Figure 7:
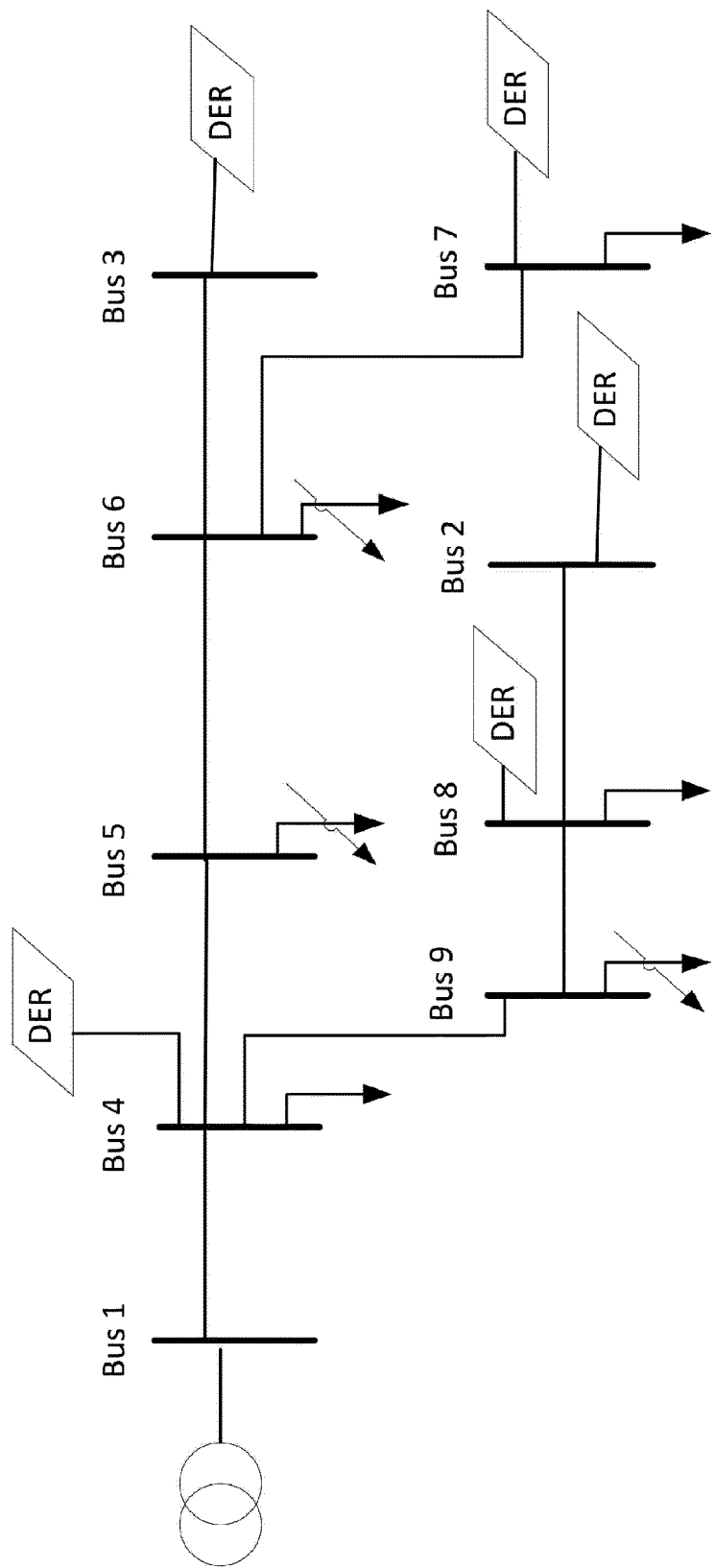
FIG. 7: A 9-bus test grid example. The downward arrows present the load. The downward arrows crossed with lopsided lines present the flexible loads. The diamond blocks with DER notation present distributed energy resources that are curtailable.

As a grid model, a 9-bus fictive radial system with eight branches, five DERs, three flexible loads for several scenarios ranging from a case without flexibility, to a case with maximum load flexibility of 29 kWh. FIG. 7 presents the grid and Table 3 and Table 4 provide parameters of the grid and generators respectively.

TABLE 1

The Parameters for the Fictive Grid Example. r, x and b are series resistance, inductance and shunt susceptance of every connection.

| Fbus | tbus | r | x | b |
|---|---|---|---|---|
| 1 | 4 | 3 | 0.2425 | 0.000181 |
| 4 | 5 | 0.9548 | 0.1023 | 8.98E−01 |
| 5 | 6 | 0.54485 | 0.0748 | 7.48E−02 |
| 3 | 6 | 0.41863 | 0.080325 | 9.20E−01 |
| 6 | 7 | 0.35952 | 0.09184 | 0.00012 |
| 8 | 2 | 0.2286 | 0.072 | 0.000107 |
| 8 | 9 | 0.19458 | 0.07332 | 0.000124 |
| 9 | 4 | 0.17264 | 0.07904 | 0.000147 |

TABLE 2

The Upper and the Lower Band of Active and Reactive Power and Flexibility. Active powers are in MW and reactive power are in MVAr.

| bus | $P_{max}$ | $P_{min}$ | $Q_{max}$ | $Q_{min}$ | $\Delta Q_{max}$ | $\Delta Q_{min}$ |
|---|---|---|---|---|---|---|
| 1 | 3 | 0 | 5.5 | −5.5 | 5.5 | −5.5 |
| 2 | 2 | 0 | 5.3 | −5.3 | 5.5 | −5.5 |
| 3 | 2 | 0 | 5.3 | −5.3 | 5.5 | −5.5 |
| 4 | 2 | 0 | 1.3 | −1.3 | 1.5 | −1.5 |
| 5 | 0 | −0.4 | 0.3 | −0.3 | 0.5 | −0.5 |
| 6 | 0 | −0.4 | 0.3 | −0.3 | 0.5 | −0.5 |
| 7 | 2 | 0 | 1.3 | −1.3 | 1.5 | −1.5 |
| 8 | 2 | 0 | 5.3 | −5.3 | 5.5 | −5.5 |
| 9 | 0 | −0.4 | 0.3 | −0.3 | 0.5 | −0.5 |

Figure 8:
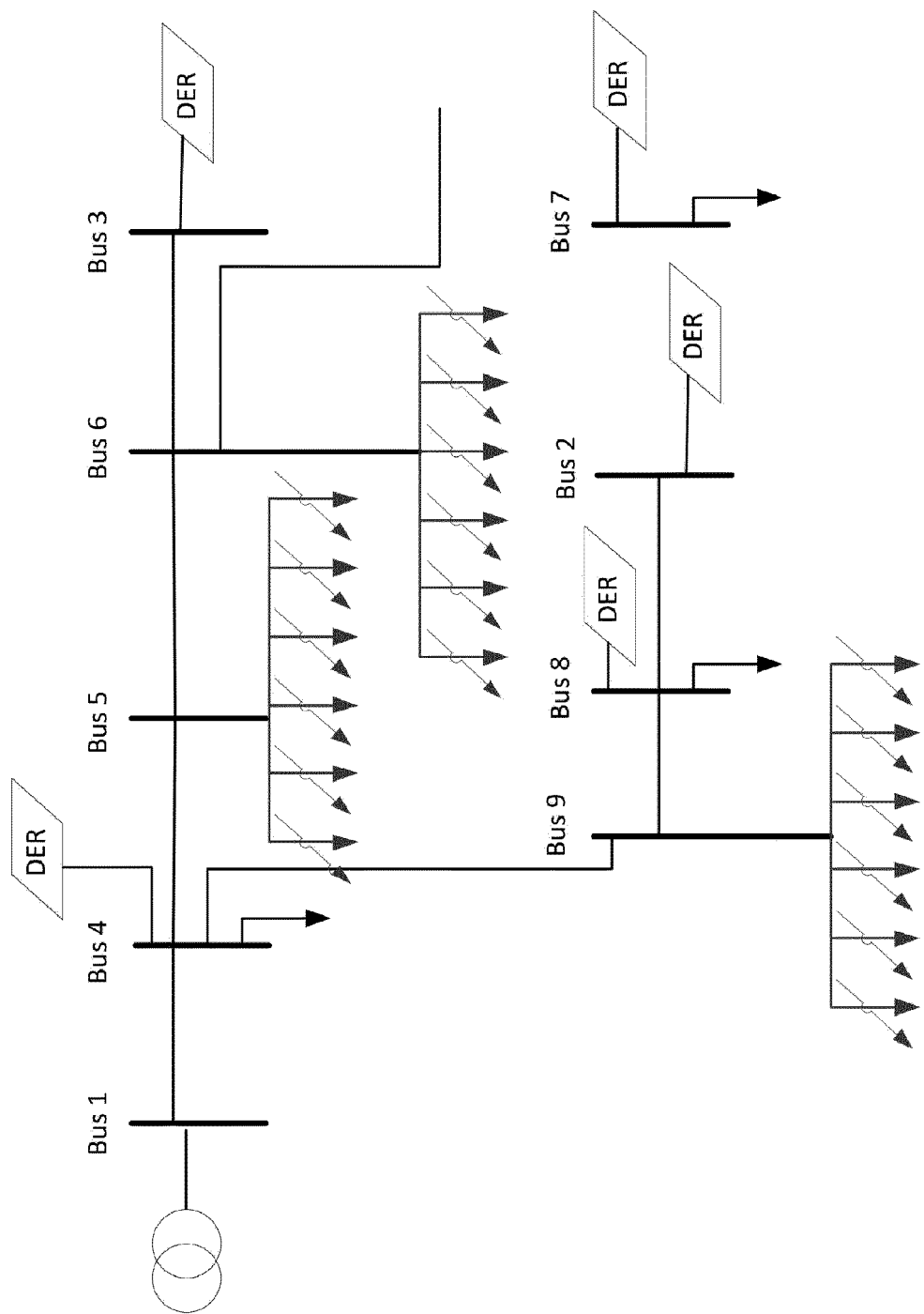
FIG. 8: The 9-bus test grid example with details of all connected buildings.

When the flexible loads on the busses 5, 6 and 9 are expanded, the detailed grid looks as In FIG. 8.

In the setup shown in FIG. 8, there are six houses in each cluster (on busses 5, 6 and 9). The aim of these simulations is to illustrate that embodiments of the present invention work, and that the different algorithms collaboratively provide the required functionality. For the purpose of testing the algorithms, following temporary simplifications and work arounds were used in the absence of real data and model.

Day-ahead prices from historical data of Belpex market are being considered.

For baseline heat load consumption, the response of the building models, in the absence of any control signal was considered. A basic heating system is assumed where the heat load is directly proportional to the electricity load.

In-house written building agents are used. Slight modifications were made to fit into the FHP framework. The building agent responds to shadow prices, in accordance with the ADMM scheme.

Upper and lower bounds for Flexibility were roughly estimated to be 7 to 9% deviation from the baseline consumption.

A constant capacity for renewable energy was assumed.

Figure 9:
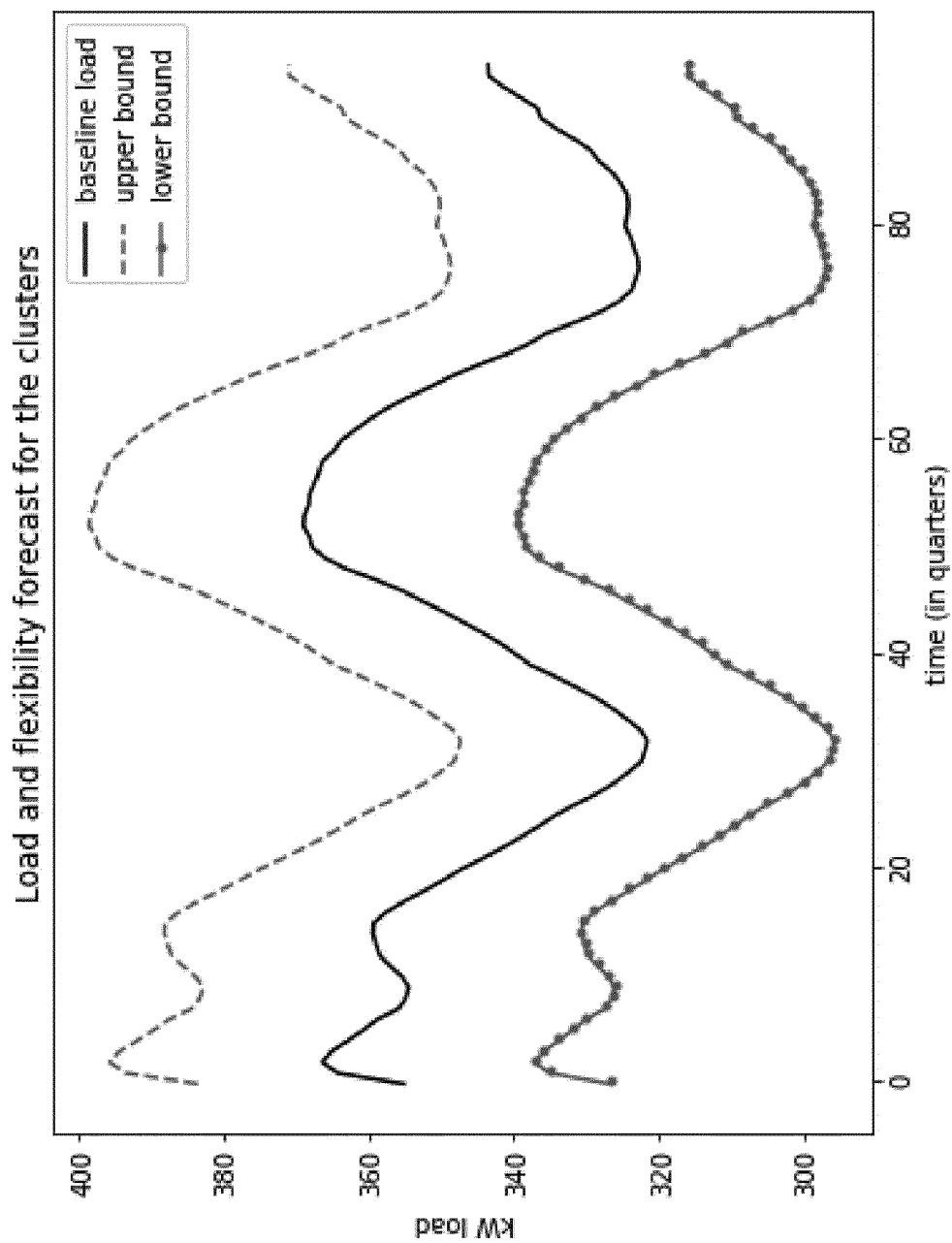
FIG. 9: Baseline and flexibility
Figure 10:
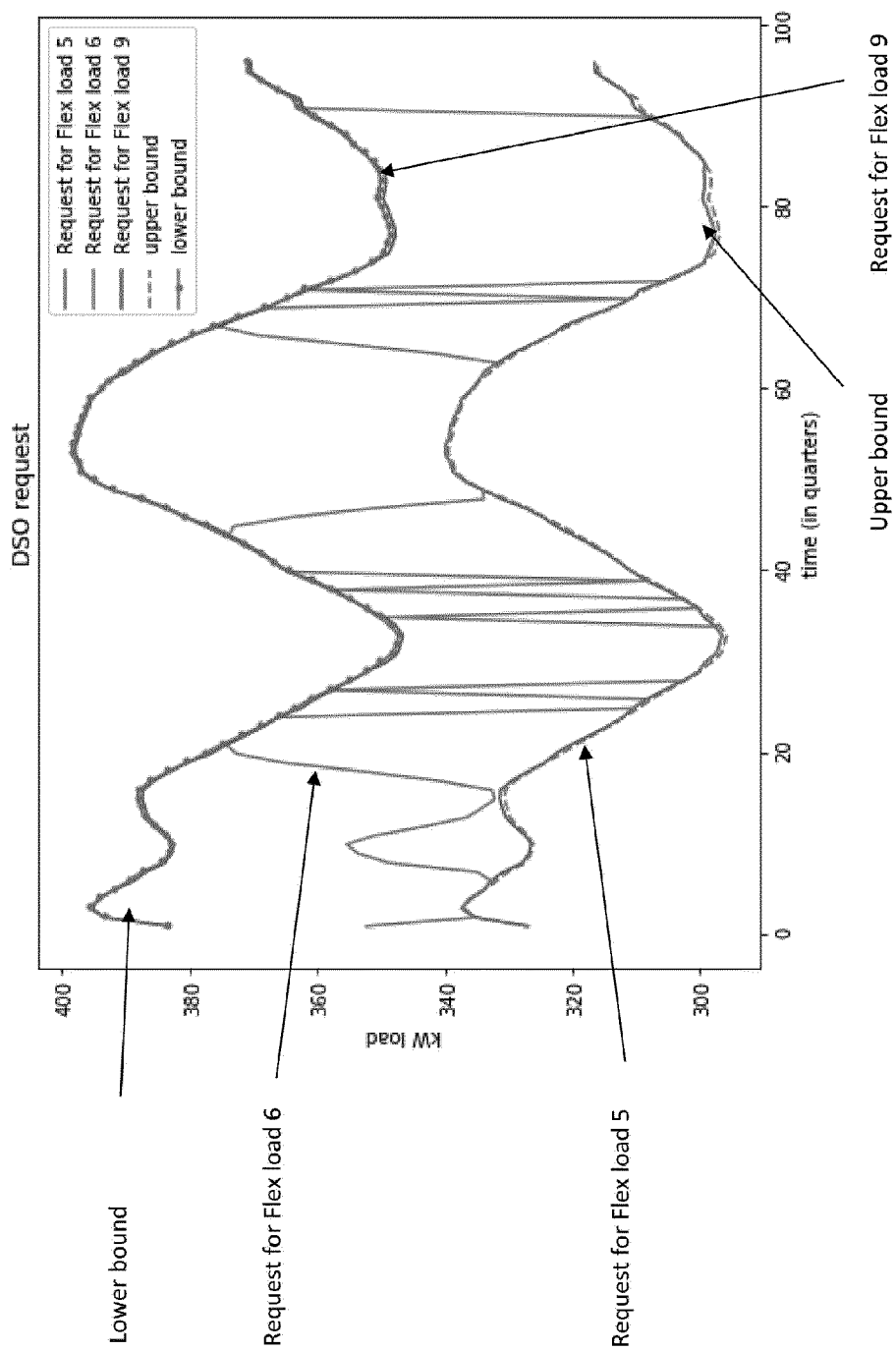
FIG. 10: Flex request from the DSO for the 3 groups

The aggregated baseline and flexibility bounds for each cluster have been setup as shown in FIG. 9.

Based on this input, the OPF algorithm is performed. The response from the DSO is given in FIG. 10.

When the DSO completes the Optimal Flexibility Dispatch algorithm, the flex request is sent to the Planner. As foreseen for the future, this flex request consists of an "acceptable region" within which there is no congestion foreseen. The Planner is then free to bid for curves within this region. Currently, these bounds are not given by the DSO. For the purpose of simulation and demonstrating the Planners algorithm, we assume a 1% bound above and below, for the Planner to do the optimization on. In options these bands can be provided by the DSO.

Figure 11:
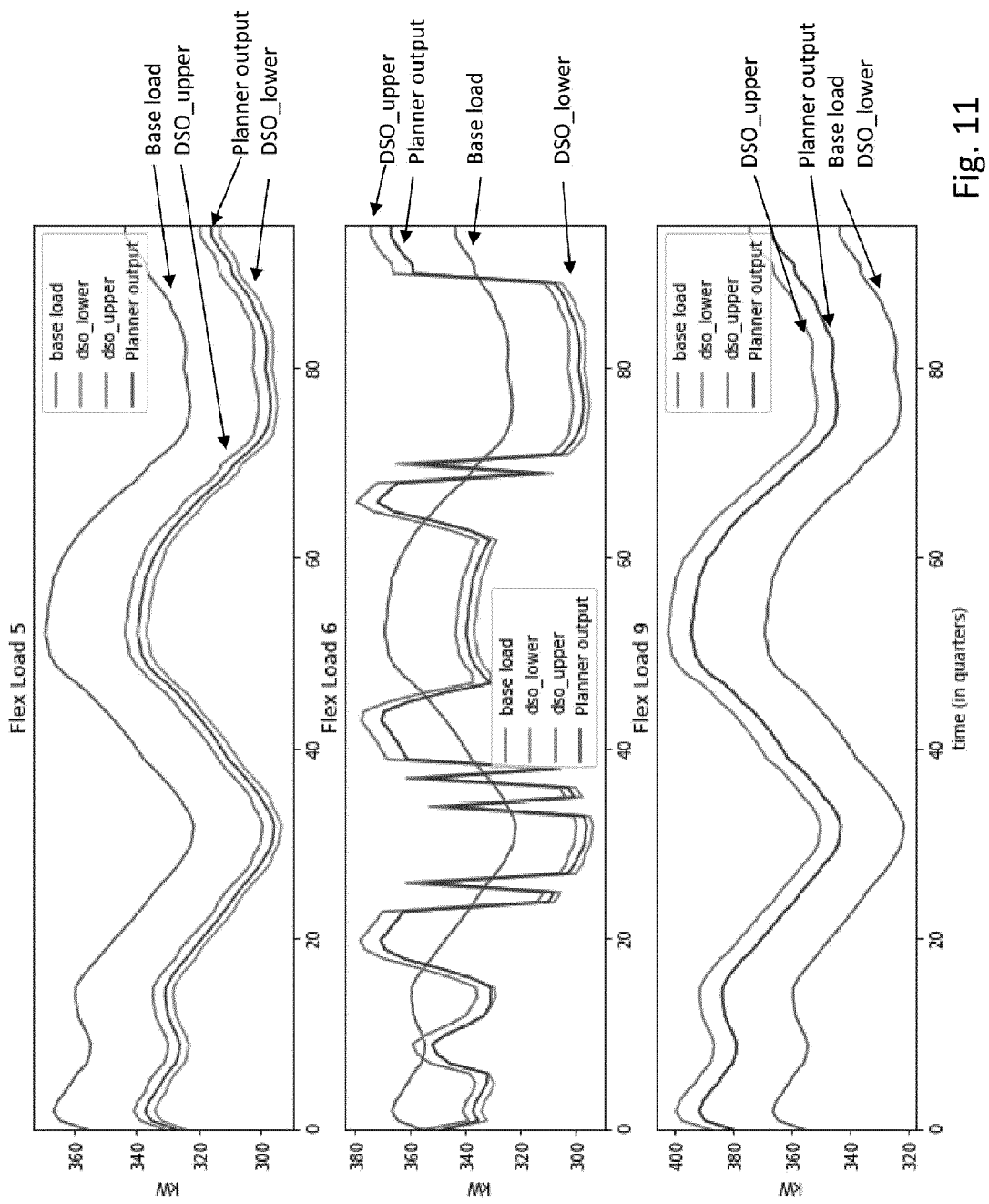
FIG. 11: Planner optimization output for each cluster

The output for each cluster is shown in FIG. 11, for each of the 3 groups (Flex loads 5, 6 and 9). In each case, it is seen that the Planner is able to satisfy the DSO's request within the given bounds.

The Tracker receives the Planners output and negotiates with the DER agents such that the total of all the responses from all the buildings meets the plan as closely as possible. This can involve communicating with external (retrofit) controllers 16 as described above. The external (retrofit) controllers 16 can manipulate an accessible external sensor output, or an accessible external data channel in order to modify the energy usage of a building or cluster of buildings.

Figure 12:
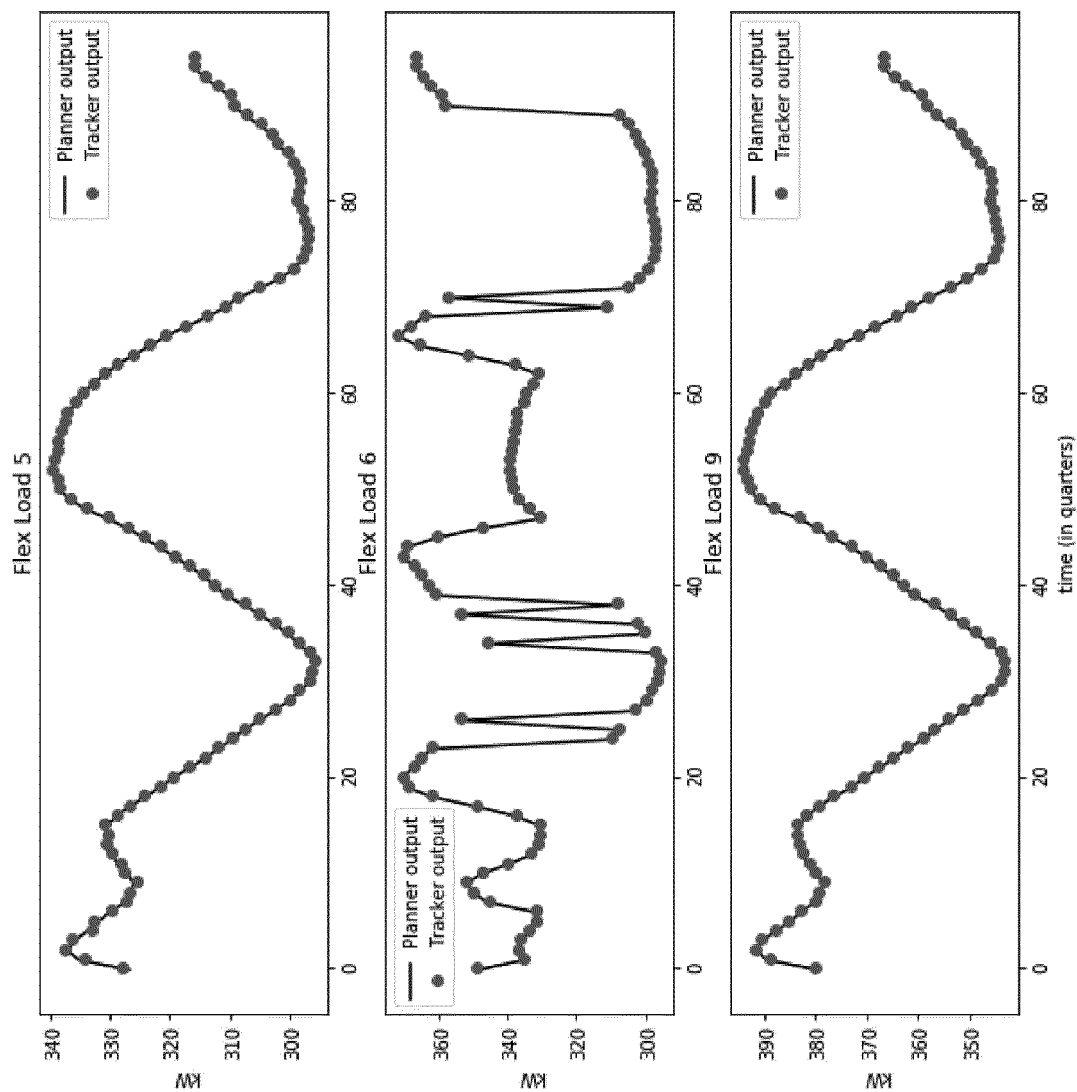
FIG. 12: Tracker output for each cluster
Figure 13:
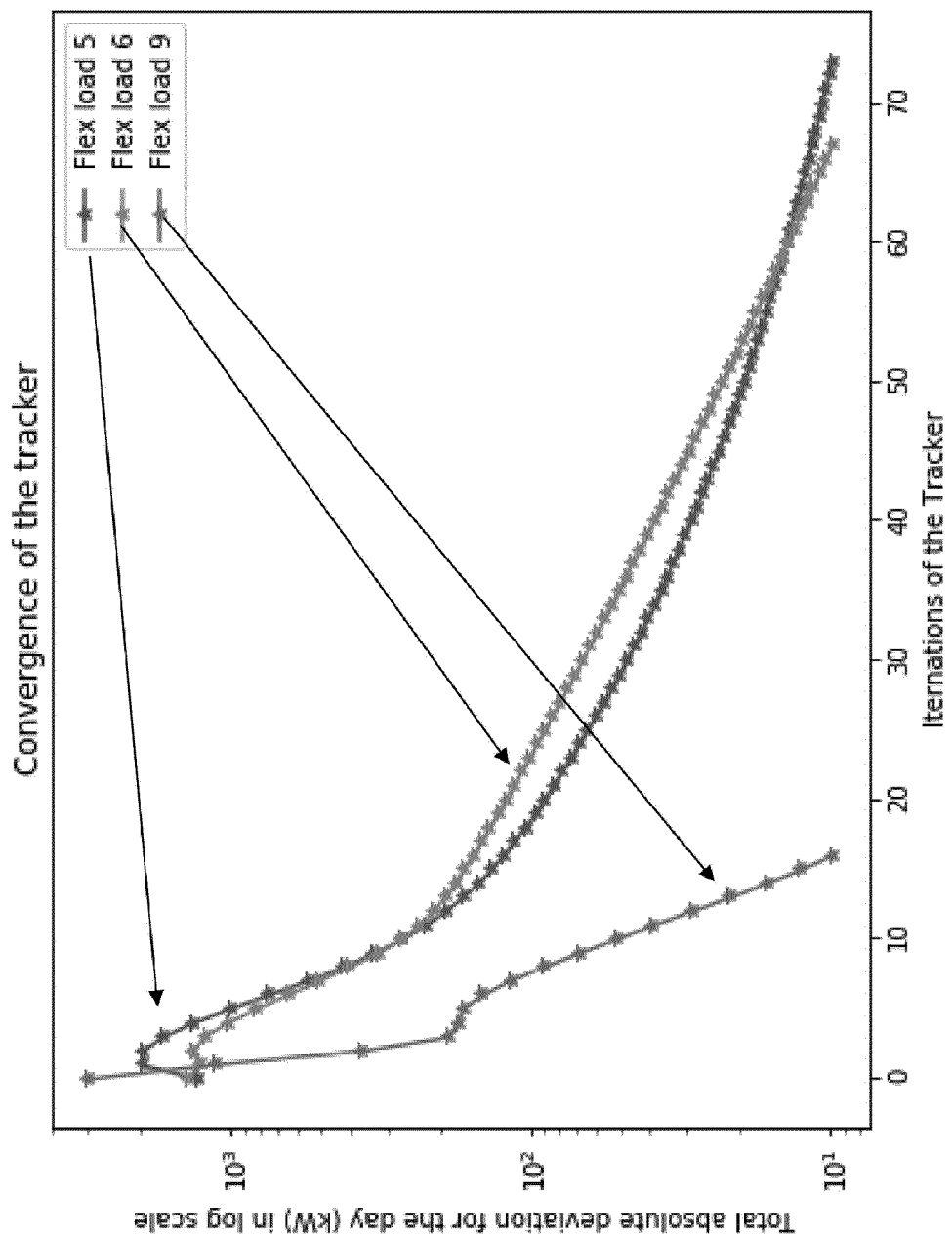
FIG. 13: Illustration of convergence of the ADMM scheme (y axis in log scale)
Figure 14:
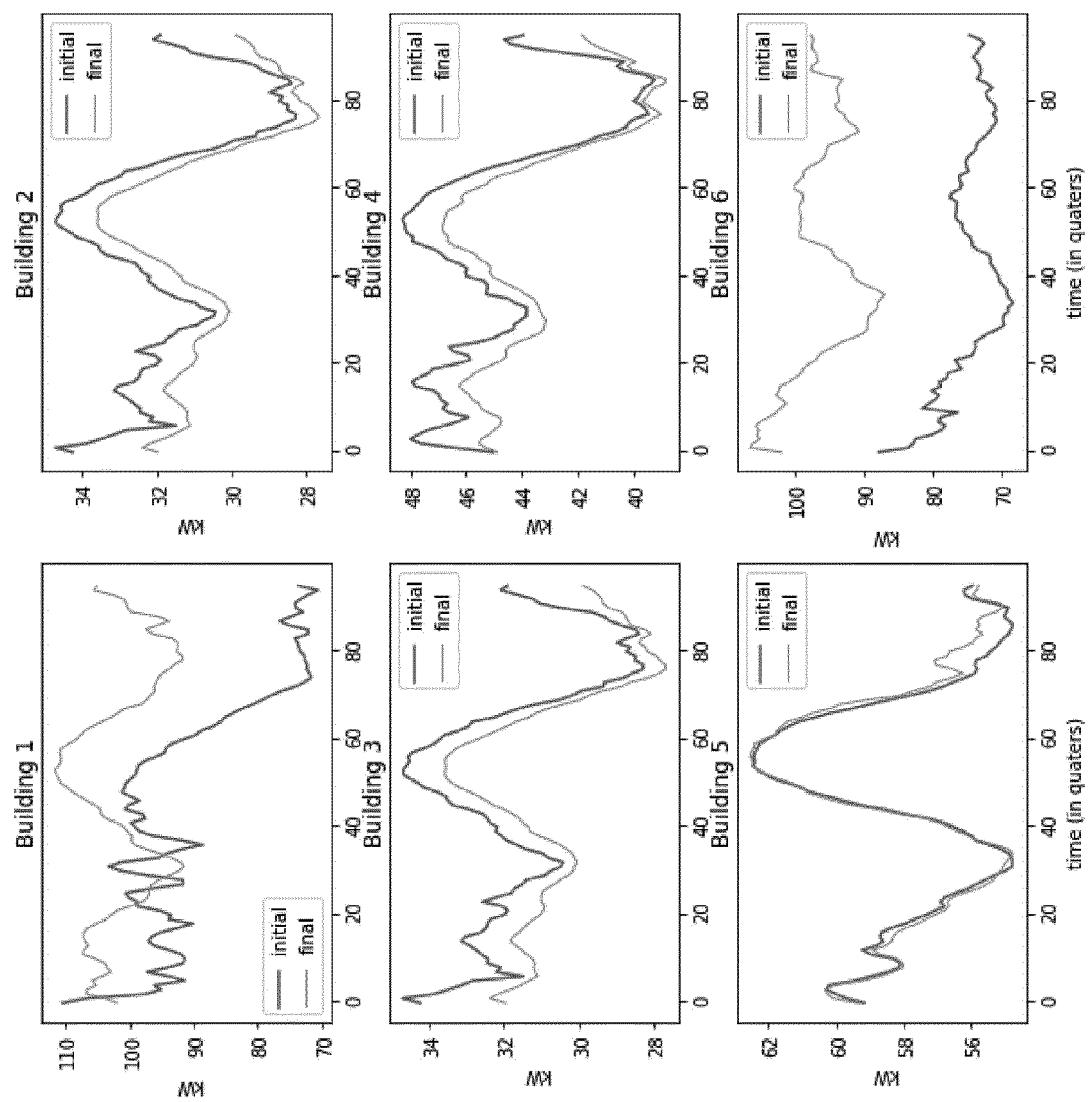
FIG. 14: Individual building responses on bus 9, before (initial) and after (final) disaggregation of flexibility

This is preferably an iterative process, and the output of such a final iteration (after convergence) is shown in FIG. 12. Here again it is seen that the Tracker is able to follow the plan for all the groups. In each case, the number of iterations is less than 80. The convergence criterion is set such that the total absolute deviation for the entire day doesn't exceed 10 kW. In FIG. 13, the convergence of the Tracker-agent interaction is illustrated in log scale. It is seen that the convergence is fast in all three cases (although it varies from cluster to cluster) and also there are no oscillations seen in the error towards convergence.

In this process, each building has responded to the Tracker, and hence has deviated from the baseline curve that was originally planned (in other words, commits to activating flexibility). This divergence from the base line can be achieved by the external (retrofit) controllers 16 manipulating an accessible external sensor output, or an accessible external data channel in order to modify the energy usage of a building or cluster of buildings. The consumption profiles before and after the negotiation process for bus 9 are show in FIG. 13. As it is observed, different buildings react differently to the prices by the tracker, and some buildings have activated more flexibility than others. This can be achieved by the external (retrofit) controllers 16 being assigned to individual buildings. A few buildings or the external (retrofit) controllers 16 for those buildings have responded by reduction in consumption, although the global objective is to increase the consumption. However, overall the final aggregated consumption of the buildings converge to the request sent by the Planner.

Local Curtailment Analysis

Figure 15:
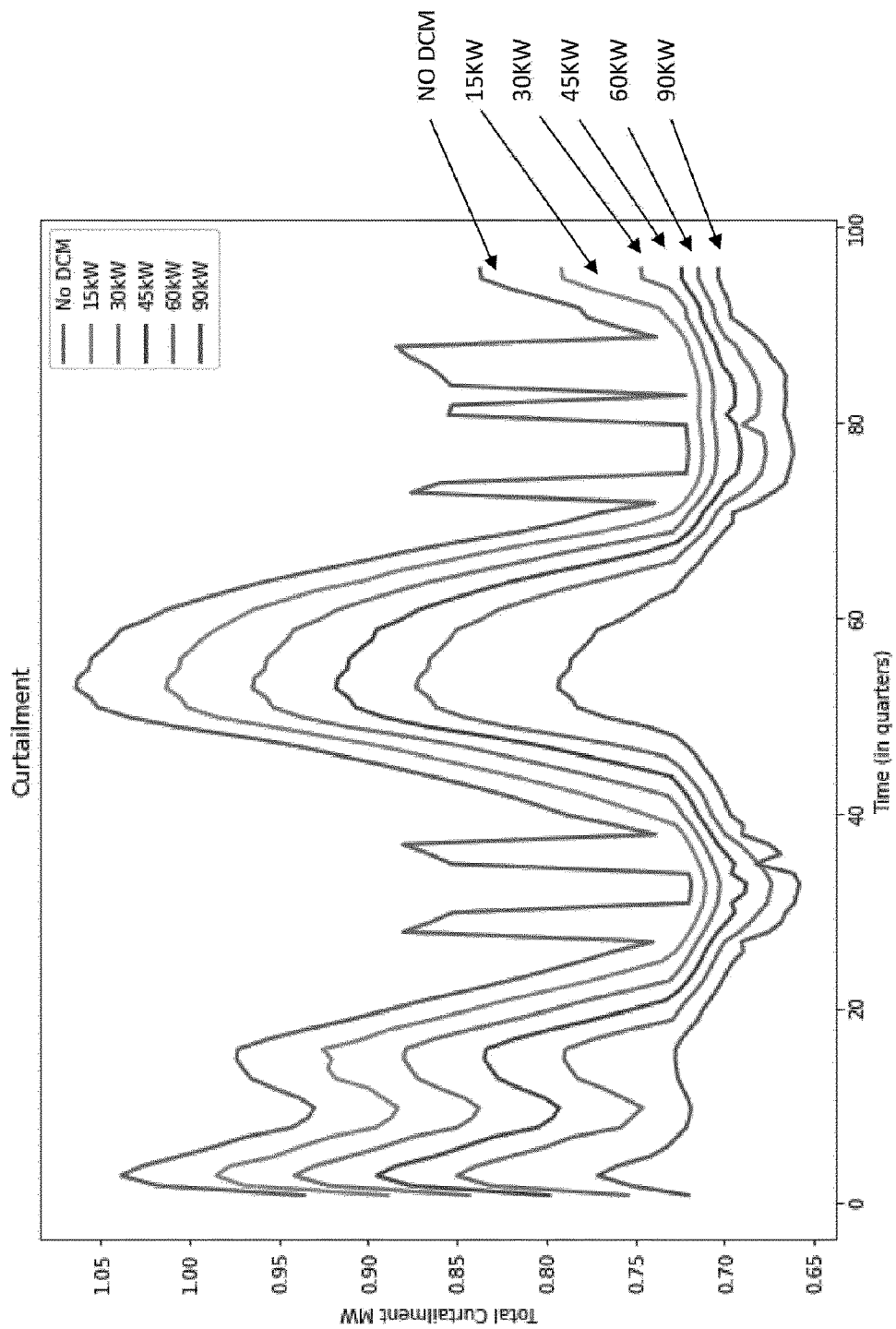
FIG. 15: RES Power Curtailment at different time steps
Figure 16:
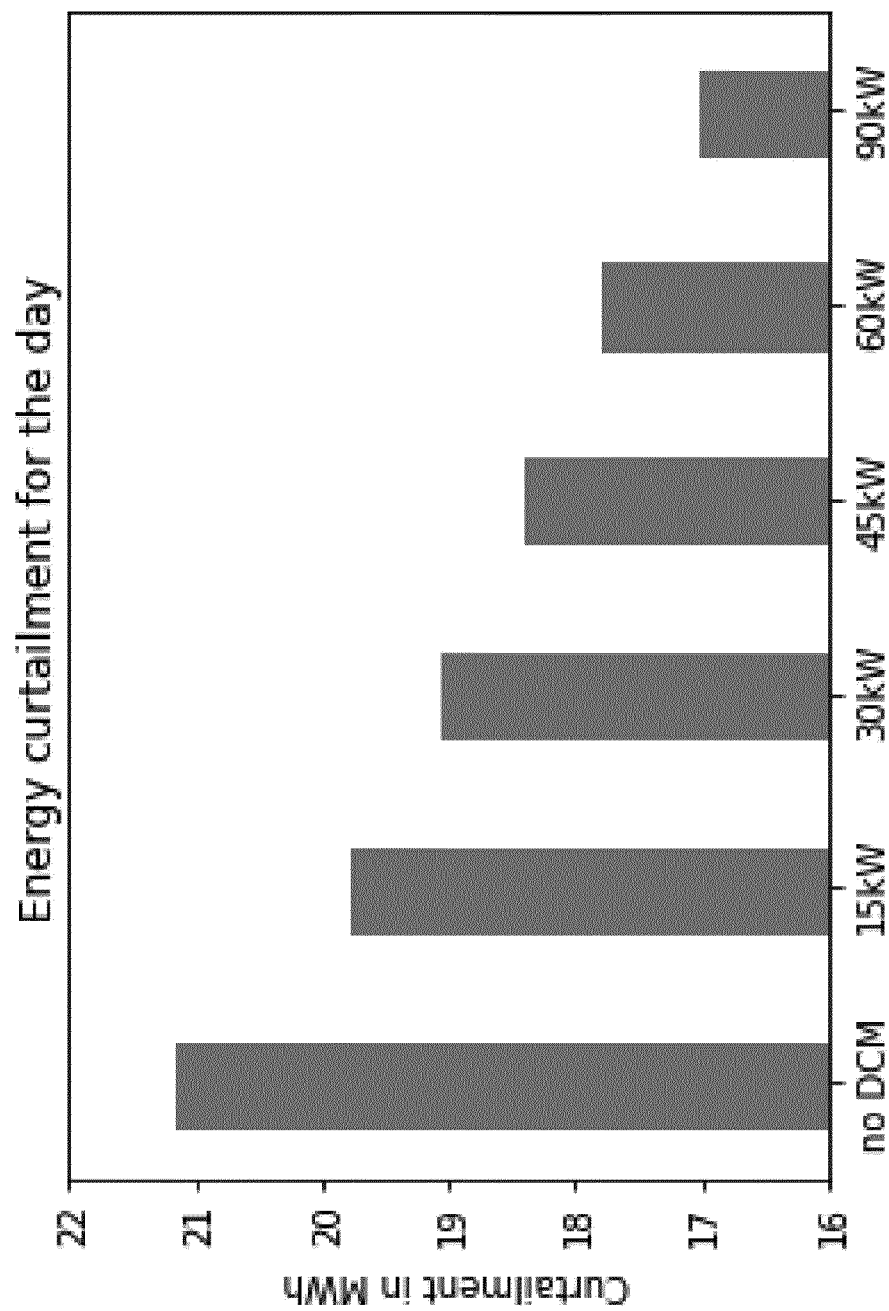
FIG. 16: RES energy curtailment
Figure 17:
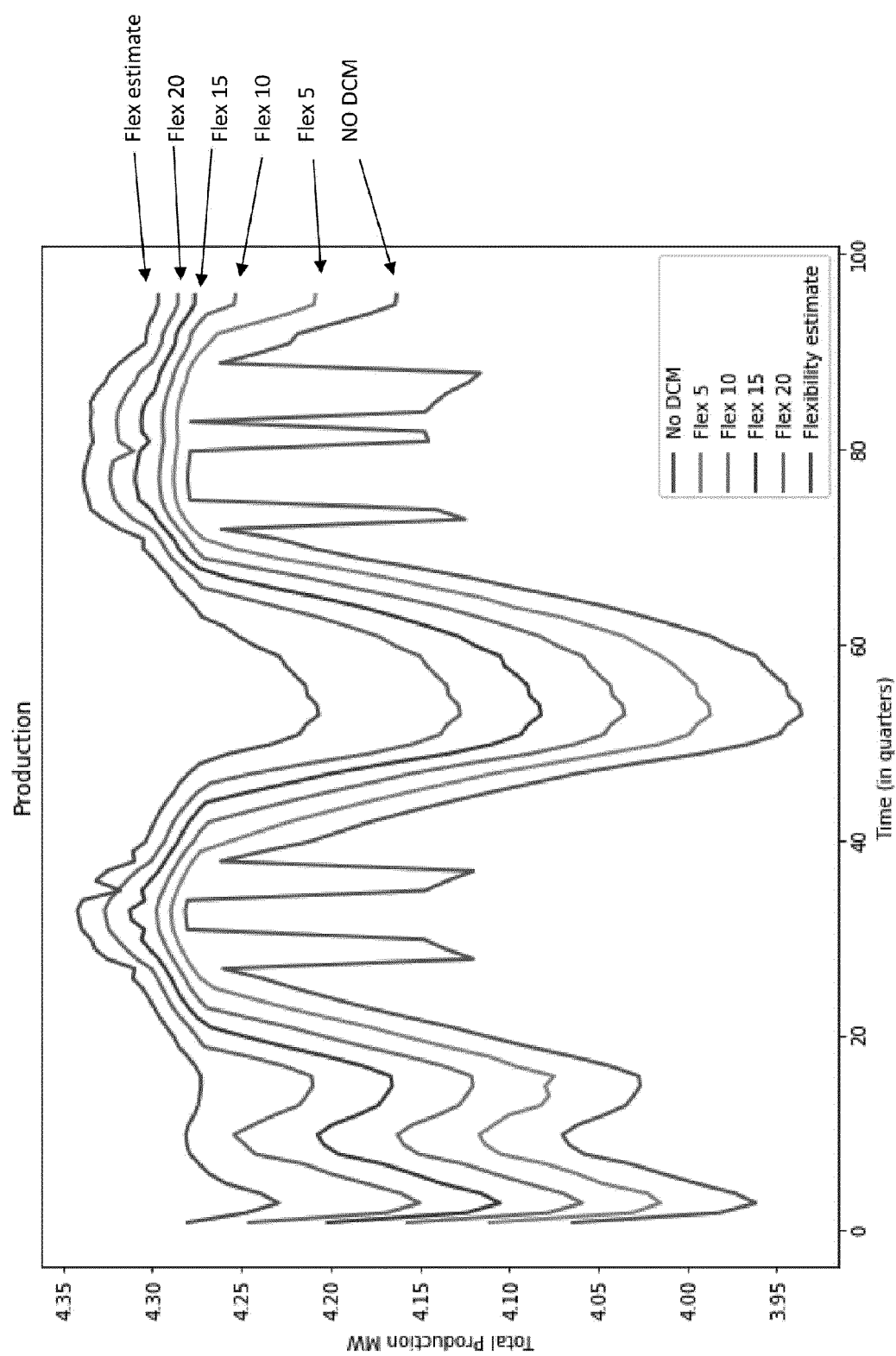
FIG. 17: RES Power production
Figure 18:
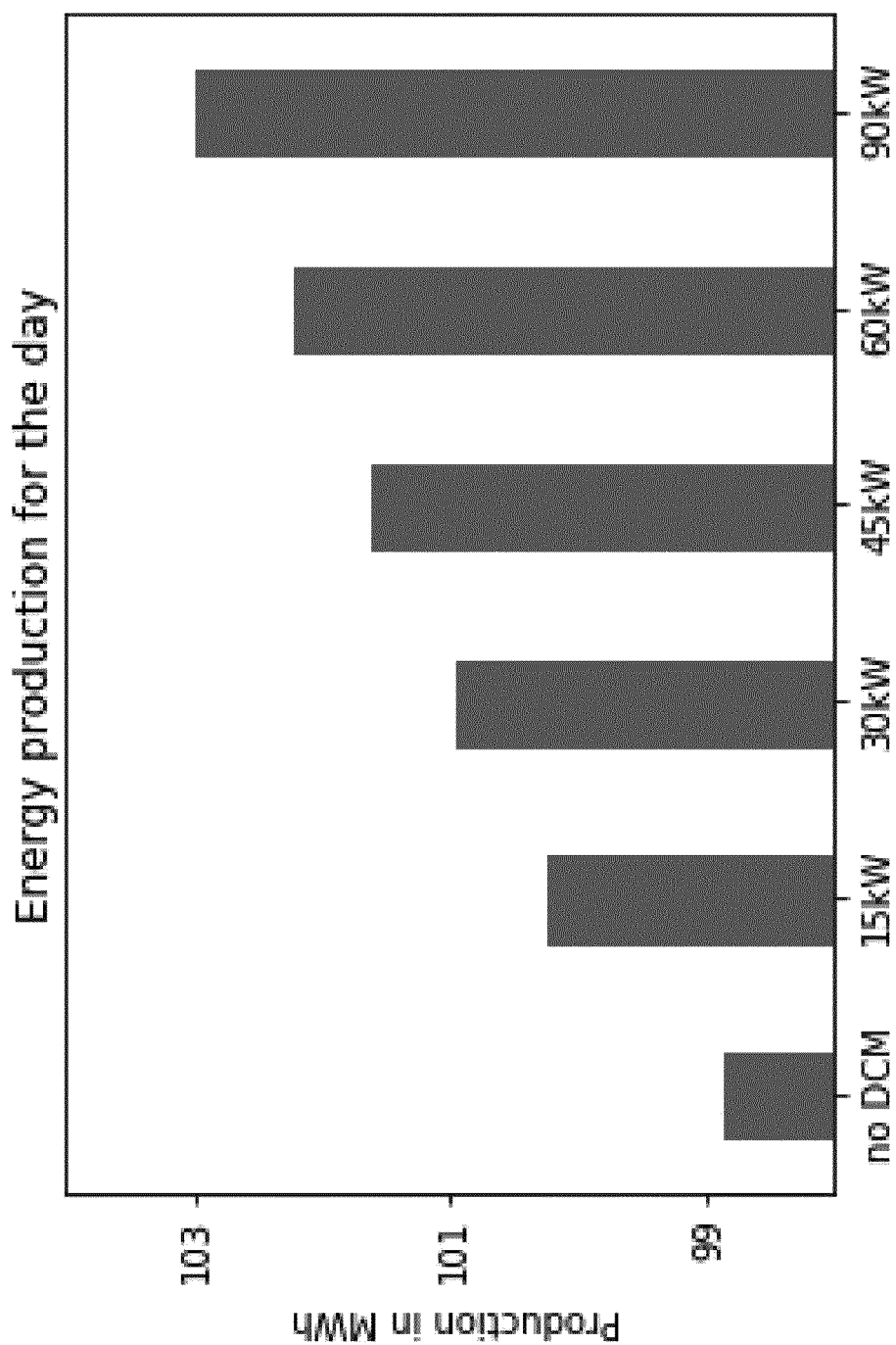
FIG. 18: Total RES energy production

To assess the possible impact of DCM-DSO interaction and flexibility activation in groups of buildings, up the following experiment was set up. The amount of flexibility offered by the flexible load is varied, starting from zero with increments of 5 kW per time step, both in upward and downward direction (15 kW in total for all clusters). The DSO performs Optimal Flexibility Dispatch in each of these cases and the total curtailment amongst all renewable energy sources is measured. This is done by adding the planned production of each of the renewable energy sources and subtracting it from the total available capacity. The total curtailment of the various renewable energy resources in terms of power and energy is shown in FIG. 15 and FIG. 16 respectively, for different levels of flexibility offered from the DCM. It can be observed in both figures that as the level of flexibility offered increases, the curtailment progressively decreases. The corresponding productions have been illustrated in FIG. 17 and FIG. 18. Here again, in line with the previous observation it is seen that the production from the renewable energy sources increases with increase in the flexibility offered. Further improvements can be achieved when the external (retrofit) controllers 16 are assigned to individual buildings or clusters of buildings and the flexibility these can achieve is taken into account by manipulating an accessible external sensor output, or an accessible external data channel in order to modify the energy usage of a building or cluster of buildings. A small manipulation, e.g. lowering an apparent outside temperature by 1° C. will have little effect upon one building but the aggregation of such a change for millions of buildings can add up to a significant change in energy usage.

FURTHER REFERENCES

Boyd, S., Parikh, N., Chu, E., Peleato, B., & Eckstein, J. (2010). Distributed Optimization and Statistical Learning via the Alternating Direction Method of Multipliers. *Foundation and Trends in Machine Learning,* 3.
C. Coffrin, H. L. (2016). The qc relaxation: A theoretical and computational study on optimal power flow. *IEEE Transactions on Power Systems,* 3008-3018.
Cesa-Bianchi, N., & Lugosi, G. (2006). *Prediction, Learning, and Games.* Cambridge University Press.
Coffrin, C. H. (2015). DistFlow extensions for AC transmission systems. *arXiv preprint arXiv:*1506. 04773.
Convex relaxation of optimal power flow: A tutorial. (2013). *Bulk Power System Dynamics and Control-IX Optimization, Security and Control of the Emerging Power Grid (IREP),* (pp. 1-15).
D. Menniti, A. P. (2014). A local market model involving prosumers taking into account distribution network congestions. *International Review of Electrical Engineering (IREE),* 976-985.
D. T. Nguyen, M. N. (2011). Pool-based demand response exchange concept and modeling. *IEEE Transactions on Power Systems,* 1677-1685.
G. Brusco, A. B. (2014). Energy management system for an energy district with demand response availability, *IEEE Transactions on Smart Grid,* 2385-2393.
G. Le Ray, E. M. (2016). Evaluating price-based demand response in practice-with application to the ecogrid eu experiment. *IEEE Transactions on Smart Grid.*
L. Gan, N. L. (2015). Exact convex relaxation of optimal power flow in radial networks. *IEEE Transactions on Automatic Control,* 72-87.
Lago, J., De Ridder, F., Vrancx, P., & De Schutter, B. (2017). Forecasting day-ahead electricity prices in Europe: the importance of considering market integration. *Applied Energy (Under review).*
Lago, J., De Ridder, F., Vrancx, P., & De Schutter, B. (2017). Forecasting spot electricity prices: deep learning approaches and empirical comparison of traditional algorithms. *Applied Energy (Under review).*
Low, L. G. (2014). Convex relaxations and linear approximation for optimal power flow in multiphase radial networks, *Power Systems Computation Conference (PSCC),* (pp. 1-9).
Low, S. (2014). Convex relaxation of optimal power flow part I: Formulations and equivalence. *IEEE Transactions on Control of Network Systems,* 15-27.
M. Marzband, A. S.-A.-G. (2013). Experimental evaluation of a real time energy management system for stand-alone microgrids in day-ahead markets. *Applied Energy,* 365-376.
Madlener, C. R. (2013). An auction design for local reserve energy markets. *Decision Support Systems,* 168-179.
Nemirovski, A. B.-T. (2001). On polyhedral approximations of the second-order cone. *Mathematics of Operations Research,* 193-205.
P. G. Da Silva, D. I. (2014). The impact of smart grid prosumer grouping on forecasting accuracy and its benefits for local electricity. *IEEE Transactions on Smart Grid,* 402-410.
P. Pinson, L. M. (2017). Towards fully renewable energy systems: Experience and trends in Denmark. *CSEE Journal of Power and Energy Systems,* 26-35.
Papavasiliou, A. (2017). Analysis of distribution locational marginal prices. *IEEE Transactions on Smart Grid.*
S. Kim, M. K. (2003). Second order cone programming relaxation of a positive semidefinite constraint. *Optimization Methods and Software,* 535-541.
Wu, M. E. (1989). Network reconfiguration in distribution systems for loss reduction and load balancing. *IEEE Transactions on Power delivery,* 1401-1407.
Zimmerman, R. D. (2010). *Matpower 4.0 b4 user's manual.* Power System Engineering Research Center.

The invention claimed is:

1. A retrofit external controller for controlling a system having devices consuming hot or cold thermal energy and for consuming or generating electric power supplied by an electricity distribution grid, the electricity distribution grid having constraints and target objectives, the constraints and target objectives being known to the retrofit external controller, comprising:
at least one device having an internal controller for controlling the use of the hot or cold thermal energy and for receiving values of variables as input to the internal controller wherein at least one value of a variable is accessible to the retrofit external controller,
the retrofit external controller being adapted to manipulate the at least one value of the variable and to supply the manipulated value of the variable to the internal controller to alter the behaviour of the at least one device to meet at least in part the constraints and target objectives of the electricity distribution grid,
wherein the at least one manipulated value of the variable is an accessible external data flow, an accessible external channel, or an accessible external sensor output whose manipulation steers the internal controller.

2. The retrofit external controller of claim 1, wherein external sensor measurements or outputs and/or one or more external data channels are manipulated according to a previously learnt response function for altering or steering the internal controller operation so as to meet external objectives and constraints without overruling the internal controller, thereby guaranteeing that internal constraints of the controlled system can also be met.

3. The retrofit external controller of claim 1, wherein the constraints and target objectives of the electricity distribution grid include any of: minimization of losses, limitations in the capacity of the grid, voltage, frequency and current stabilization.

4. The retrofit external controller of claim 3, wherein the retrofit external controller is adapted to receive updated constraints and target objectives of the electricity distribution grid.

5. The retrofit external controller of claim 4, wherein the updated constraints and target objectives are for local distribution grid level renewable energy source curtailment mitigation in a grid secure manner, system renewable energy source curtailment mitigation, excess renewable energy source absorption maximization using distribution grid connected flexibility within the local grid constraints, or balancing services using distribution grid connected flexibility within the local grid constraints.

6. The retrofit external controller of the claim 2, further comprising means for learning responses of the at least one device to the manipulated value of the variable.

7. The retrofit external controller according to claim 1, wherein a transfer function of the internal controller is unknown to the retrofit external controller.

8. The retrofit external controller according to claim 1, wherein the retrofit external controller does not alter security based set-points, does not override security cut-outs or fuses or suppress alarms, does not override thermostats of the at least one device, or does not override local security features.

9. The retrofit external controller according to claim 1, wherein the internal controller is part of a building management system.

10. The retrofit external controller according claim 1, wherein the at least one value of the variable accessible to the retrofit external controller is selected from outside temperature, availability of electricity, a temperature, and or flow rate in heating, flow rate in cooling networks, voltage, frequency, currents, in electric distribution networks.

11. The retrofit external controller according to claim 1, further comprising a filter to track drift of the at least one value of the variable.

12. A method of controlling a system having devices consuming hot or cold thermal energy and for consuming or generating electric power supplied by an electricity distribution grid, the electricity distribution grid having constraints and target objectives, at least one device having an internal controller for controlling the use of the hot or cold thermal energy and for receiving values of variables as input to the internal controller, the method comprising:
retrofitting an external controller wherein at least one value of a variable is accessible to the external controller, the retrofitted external controller manipulating the at least one value of the variable and
supplying the manipulated value of the variable to the internal controller to alter the behaviour of the at least one device to meet at least in part the constraints and target objectives of the electricity distribution grid,
wherein the at least one manipulated value of the variable is an accessible external data flow, an accessible external channel, or an accessible external sensor output whose manipulation steers the internal controller.

13. The method of claim 12, wherein the constraints and target objectives of the electricity distribution grid include any of minimization of losses, limitations in the capacity of the grid, voltage, frequency and current stabilization.

14. The method of claim 13, wherein the constraints and target objectives of the electricity distribution grid are updated.

15. The method of claim 14, wherein the updated constraints and target objectives are for local distribution grid level renewable energy source curtailment mitigation in a grid secure manner, system renewable energy source curtailment mitigation, excess renewable energy source absorption maximization using distribution grid connected flexibility within the local grid constraints, or balancing services using distribution grid connected flexibility within the local grid constraints.

16. The method of claim 12, further comprising the external controller learning responses of the at least one device to the manipulated value of the variable.

17. The method of claim 12, further comprising filtering to track a drift in the at least one value of the variable.

18. An industrial site having a hierarchical structure with at least a first and a second controller level and at least a retrofit external controller according to claim 1 in at least one of the first and second controller level, the external retrofit controller having access to an external value of a variable and being adapted to manipulate the external value of the variable, and to supply a control signal to a further controller at a lower controller level of the hierarchical structure.

19. A non-transitory computer program product which when executed on a processor executes the method according to claim 12.

20. A retrofit external controller for controlling a system having devices consuming a thermal energy, where said thermal energy comprises at least one member selected from the group of hot thermal energy and cold thermal energy, and for consuming or generating electric power supplied by or to an electricity distribution grid, the electricity distribution grid having constraints and target objectives, the constraints and target objectives being known to the retrofit external controller, comprising:
at least one device having an internal controller for controlling the use of the thermal energy and for receiving values of variables as input to the internal controller wherein at least one value of a variable is accessible to the retrofit external controller,
the retrofit external controller being configured to manipulate the at least one value of the variable and to supply the manipulated value of the variable to the internal controller to alter the behaviour of the at least one device to meet at least in part the constraints and target objectives of the electricity distribution grid, and
wherein the at least one manipulated value of the variable is an accessible external data flow, an accessible external channel, or an accessible external sensor output whose manipulation steers the internal controller.

* * * * *